(12) United States Patent
Chiussi et al.

(10) Patent No.: US 11,477,617 B2
(45) Date of Patent: Oct. 18, 2022

(54) UNICASTING AND MULTICASTING MULTIMEDIA SERVICES

(75) Inventors: Fabio M. Chiussi, Long Beach, NJ (US); Roshan M. Rao, Acton, MA (US)

(73) Assignee: ERICSSON EVDO INC., Dover, DE (US)

( * ) Notice: Subject to any disclaimer, the term of this patent is extended or adjusted under 35 U.S.C. 154(b) by 362 days.

(21) Appl. No.: 11/385,009

(22) Filed: Mar. 20, 2006

(65) Prior Publication Data
US 2007/0220573 A1    Sep. 20, 2007

(51) Int. Cl.
| | |
|---|---|
| H04N 7/173 | (2011.01) |
| H04W 4/08 | (2009.01) |
| H04N 21/6405 | (2011.01) |
| H04L 12/18 | (2006.01) |
| H04W 8/18 | (2009.01) |
| H04N 21/6408 | (2011.01) |

(Continued)

(52) U.S. Cl.
CPC ............ *H04W 4/08* (2013.01); *H04L 12/189* (2013.01); *H04N 21/6405* (2013.01); *H04N 21/6408* (2013.01); *H04W 8/186* (2013.01); *H04L 65/1016* (2013.01); *H04L 65/611* (2022.05)

(58) Field of Classification Search
CPC .................................................... H04L 12/189
USPC ........................................ 370/392, 354, 401
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |
| 6,741,862 B2 | 5/2004 | Chung et al. |

(Continued)

FOREIGN PATENT DOCUMENTS

| | | | |
|---|---|---|---|
| EP | 1 583 312 | 10/2005 | ............. H04L 29/06 |
| EP | 1583312 A1 * | 10/2005 | ....... H04L 29/12009 |
| GB | 2450285 | 12/2008 | |

OTHER PUBLICATIONS

International Search Report issued in corresponding International Application PCT/US07/64364, dated Feb. 26, 2008.

(Continued)

*Primary Examiner* — Noel R Beharry
*Assistant Examiner* — Pamit Kaur
(74) *Attorney, Agent, or Firm* — Ericsson Inc.

(57) ABSTRACT

A network entity controls delivery of information to user devices over bearer paths including unicast channels and multicast channels. The network entity may interoperate in any of a number of network architectures, including 3GPP Internet Protocol Multimedia Subsystem (IMS) and 3GPP2 Multimedia Domain (MMD). The network entity may provide functionality of a modified 3GPP2 Broadcast and Multicast Service (BCMCS) controller component configured to enable BCMCS signaling protocol transactions to occur over 3GPP IMS interfaces and/or 3GPP2 MMD interfaces. A network entity configured to interoperate in a 3GPP IMS and/or 3GPP2 MMD network architecture may provide network-mobile multimedia services to user devices. Content associated with the multimedia services may be stored in storage devices in the network. A common interface through which a network operator defines service-specific parameters of a number of unicast and multicast (Continued)

multimedia services deployed in a distribution network may be provided.

80 Claims, 10 Drawing Sheets

(51) Int. Cl.
*H04L 65/1016* (2022.01)
*H04L 65/611* (2022.01)

(56) References Cited

U.S. PATENT DOCUMENTS

| | | | |
|---|---|---|---|
| 6,769,127 B1* | 7/2004 | Bonomi et al. | 725/39 |
| 6,781,999 B2 | 8/2004 | Eyuboglu et al. | |
| 7,080,400 B1* | 7/2006 | Navar | 725/139 |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 2002/0196749 A1 | 12/2002 | Eyuboglu et al. | |
| 2003/0100311 A1 | 5/2003 | Chung et al. | |
| 2003/0172114 A1* | 9/2003 | Leung | H04W 28/06 709/205 |
| 2004/0045030 A1* | 3/2004 | Reynolds | H04L 29/06 725/110 |
| 2004/0062200 A1* | 4/2004 | Kesavan | H04L 47/10 370/235 |
| 2004/0181800 A1* | 9/2004 | Rakib | H04L 63/062 725/25 |
| 2004/0196906 A1* | 10/2004 | Gordon | H04N 5/4401 375/240.12 |
| 2005/0058125 A1* | 3/2005 | Mutikainen | H04L 29/12292 370/354 |
| 2005/0089052 A1* | 4/2005 | Chen et al. | 370/401 |
| 2005/0118946 A1* | 6/2005 | Colban | H04L 12/1881 455/3.06 |
| 2005/0204389 A1* | 9/2005 | Proehl et al. | 725/60 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2005/0266848 A1 | 12/2005 | Kim | 455/436 |
| 2006/0020971 A1* | 1/2006 | Poslinski | 725/44 |
| 2006/0067422 A1 | 3/2006 | Chung | |
| 2006/0067451 A1 | 3/2006 | Pollman et al. | |
| 2006/0085553 A1* | 4/2006 | Rachwalski et al. | 709/233 |
| 2006/0126509 A1 | 6/2006 | Abi-Nassif | |
| 2006/0159045 A1 | 7/2006 | Ananthaiyer et al. | |
| 2006/0198359 A1* | 9/2006 | Fok et al. | 370/351 |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0019670 A1* | 1/2007 | Falardeau | 370/465 |
| 2007/0026884 A1 | 2/2007 | Rao | |
| 2007/0054640 A1* | 3/2007 | Wada | H04H 60/11 455/226.1 |
| 2007/0058628 A1 | 3/2007 | Rao et al. | |
| 2007/0061862 A1* | 3/2007 | Berger et al. | 725/139 |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0127476 A1* | 6/2007 | Seppala | 370/390 |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0147411 A1* | 6/2007 | Bijwaard | H04L 12/185 370/432 |
| 2007/0155329 A1 | 7/2007 | Mehrabanzad et al. | |
| 2007/0209061 A1* | 9/2007 | Dekeyzer et al. | 726/3 |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0070611 A1* | 3/2008 | Yi et al. | 455/515 |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |

OTHER PUBLICATIONS

*International Preliminary Report on Patentability* dated Oct. 2, 2008, in corresponding PCT application No. PCT/US2007/064364 (12 pages).
European Standard (Telecommunications series), "Digital Video Broadcasting (DVB): Transmission System for Handheld Terminals (DVB-H)", ETSI EN 302 304 version 1.1.1, Nov. 2004 (14 pages).
European Standard (Telecommunications series), "Digital Video Broadcasting (DVB): Transmission System for Handheld Terminals (DVB-H)", ETSI EN 302 304 version 1.1.1, Nov. 2004 (105 pages).
DVG Digital Video Broadcasting, "DVB-H Implementation Guidelines", DVB Document A092 Rev. 2, May 2007 (111 pages).
Digital Video Broadcasting website, www.dvb.org (2 pages).
FLOForum website, www.floforum.org (1 page).
Handley, et al., "SDP: Session Description Protocol", Network Working Group, Request for Comments: RFC 2327, Apr. 1998, www.ietf.org (33 pages).
Rigney, et al., "Remote Authentication Dial in User Service (RADIUS)", Network Working Group, Request for Comments: RFC 2865, Jun. 2000, www.ietf.org (71 pages).
Rosenberg, et al., "SIP: Session Initiation Protocol", Network Working Group, Request for Comments: RFC 3261, Jun. 2002, www.ietf.org (252 pages).
Calhoun, et al., "Diameter Base Protocol", Network Working Group, Request for Comments: RFC 3588, Sep. 2003, www.ietf.org (138 pages).
European Standard (Telecommunications series), "Forward Link Only Air Interface; Specification for Terrestrial Mobile; Multimedia Multicast", ETSI TS 102 589 version 1.1.1, Feb. 2009 (17 pages).
3rd Generation Partnership Project 2 "3GPP2", "IP Multimedia Domain: System Requirements", S.R0058, version 1, Apr. 17, 2003 (27 pages).
3rd Generation Partnership Project 2 "3GPP2", "Broadcast and Multicast Service in cdma2000 Wireless IP Network", X.S0022-A, version 1, Feb. 16, 2007 (143 pages), revision of X.S0022-0.
3rd Generation Partnership Project 2 "3GPP2", "All-IP Core Network Multimedia Domain: Overview", X.S0013-000-A, version 1, Nov. 2005 (27 pages).
3rd Generation Partnership Project 2 "3GPP2", "All-IP Core Network Multimedia Domain: Overview", X.S0013-000-B, version 1, Dec. 2007 (24 pages).
3rd Generation Partnership Project 2 "3GPP2", "All-IP Core Network Multimedia Domain: IP Multimedia Subsystem—Stage 2", X.S0013-002-0, version 1, Dec. 2003 (134 pages).
3rd Generation Partnership Project 2 "3GPP2", "All-IP Core Network Multimedia Domain: IP Multimedia Subsystem—Stage 2", X.S0013-002-A, version 1, Nov. 2005 (179 pages).

(56) References Cited

OTHER PUBLICATIONS

3rd Generation Partnership Project 2 "3GPP2", "All-IP Core Network Multimedia Domain: IP Multimedia Subsystem—Stage 2", X.S0013-002-B, version 1, Dec. 2007 (192 pages).
3rd Generation Partnership Project 2 "3GPP2", "All-IP Core Network Multimedia Domain: Overview", X.S0013-000-0, version 2, Jul. 2005 (28 pages).
3rd Generation Partnership Project 2 "3GPP2", "All-IP Core Network Multimedia Domain: Overview", X.S0013-000-0, version 1, Dec. 2003 (18 pages).
3rd Generation Partnership Project 2 "3GPP2", "Presence Service: Architecture and Functional Description", X.S0027-001-0, version 1, Sep. 2004 (32 pages).
Background section of Invention Disclosure Document for U.S. Appl. No. 11/385,009 (this application).
Response to Examination Report from corresponding United Kingdom Patent Application No. GB 0818765.0 dated Aug. 16, 2010, filed Dec. 14, 2010 (24 pages).
An Examination Report from corresponding United Kingdom Patent Application No. GB0818765.0 dated Jan. 27, 2011 (3 pages).
Response to Examination Report from corresponding United Kingdom Patent Application No. GB0818765.0 dated Jan. 27, 2011, filed Mar. 28, 2011 (2 pages).
Examination Report from corresponding United Kingdom Patent Application No. GB0818765.0 dated Aug. 16, 2010 (3 pages).

\* cited by examiner

UNICASTING AND MULTICASTING MULTIMEDIA SERVICES

BACKGROUND

This description relates to multicasting and unicasting multimedia services.

Streaming movies, sports-clips, weather forecasts, newscasts, music, etc. have become increasingly popular with users. Multimedia streams—combinations of audio, visual, and data formats—convey a richness of content that enhances user experience. New and innovative multimedia services, as well as variations of existing multimedia services, are generated on a continuing basis. Examples of multimedia services include television and video services, video on demand (VOD), private video recording (PVR), radio, music distribution services, clip casting, pod casting, push-to-talk (PTT) services, push-to-media (PTM) services, multimedia messaging services (MMS), interactive gaming, multimedia conferencing, video telephony, and venue casting.

Initially, these services were delivered exclusively over high-speed wireline or cable networks. Over time demand has rapidly grown for delivery of multimedia services through an air interface to a variety of mobile devices, such as cell phones, personal digital assistants (PDAs), and laptops. Typically, multimedia content delivery requires a large amount of transmission bandwidth. This places demands on network bandwidth capacity, which will only increase as users demand more content with higher resolution and better quality.

Due to the large bandwidth requirements and the elaborate nature of the services, the distribution and delivery of multimedia services over wireline and wireless networks presents considerable technical challenges. Modern cellular and broadband wireless technologies have the potential capabilities of delivering sufficient bandwidth to the user to support multimedia content. In order to make mobile multimedia services a reality and drive them to the mass market, a variety of technologies is being developed to create the service infrastructure to support these services within the cellular and broadband wireless infrastructure.

Multimedia services may be delivered by either unicast or broadcast/multicast transport technologies.

In certain circumstances, multiple users may be interested in the same multimedia content. To alleviate the need for data replication, some networks provide a broadcast or multicast channel that reduces the demands on the bandwidth capacity by allowing more than one user to receive the information without requiring more than one point-to-point transmission. In the 3G cellular arena, for example, protocols and frameworks have been proposed that provide Over-The-Air (OTA) broadcast physical channels in the existing cellular network. These channels can be accessed by any number of users simultaneously to receive the same content without adversely affecting bandwidth usage. Two popular cellular technologies, Global System for Mobile Communications (GSM) and Code Division Multiple Access (CDMA) both have similar capabilities. GSM, whose specifications are discussed and standardized in 3GPP (such specifications are made available at http://www.3gpp.org), has a service called Multimedia Broadcast/Multicast Service (MBMS). Similarly, CDMA, whose specifications are discussed and standardized in 3GPP2 (such specifications are made available at http://www.3gpp2.org), has a service called Broadcast-Multicast Services (BCMCS). MBMS and BCMCS are also known as in-band broadcast/multicast technologies, since they operate in the same band of conventional unicast GSM (for MBMS) or CDMA (for BCMCS) services and are implemented on the same cellular networks as GSM or CDMA, just by adding additional capabilities to the existing air interfaces. The notion of in-band broadcast/multicast is not limited to cellular networks, but is also known in several broadband wireless technologies as well. For example, Worldwide Interoperability for Microwvave Access (WiMAX), whose specifications are made available at http://www.wimaxforum.org, has a service called Multicast Broadcast Service (MCBCS) that offers these capabilities.

Referring to FIG. 1, from a high-level architectural perspective 100, these wireless networks include a number of similarly functional components. Some of these functional components may be implemented using more than one physical component.

A Content Provider System 102 is responsible for procuring and delivering the content to a Broadcast-Capable Distribution Network 104. Content is produced by content providers such as nationwide or local TV channels (not shown), and stored on servers in the network (not shown) for subsequent retrieval and distribution. Different content providers may use different servers to store their own content. Typically, the network operator puts in place commercial agreements with one or more content providers. Once the agreements are in place, the network operator retrieves the content and prepares it for distribution. The Content Provider System 102 usually has an interface 106 with a Controller 108 and a data path 110 with the Broadcast-capable Distribution Network 104.

The Broadcast-Capable Distribution Network 104 (BCDN) receives content from the Content Provider System 102 and is responsible for all processing needed to transmit the content over-the-air to all the users authorized to receive content in that network. The specific processing done depends on the particular technology being used. The BCDN network 104 has the capability of broadcasting or multicasting the content using one of the technologies described above. From a functional point of view, this component is typically responsible for setting up the bearer path in a Radio Access Network (RAN) (not shown). Conceptually, the bearer path is the unicast or multicast connection through which the content is delivered to the users. This functionality is achieved in one or more of the nodes in the network.

A Broadcast-Capable Air Interface 112 is dependent on the particular technology being used. For the air interface to be broadcast capable, it has to provide capabilities for creating a multi-access Over-the-Air (OTA) channel, meaning that multiple users can tune to the same channel and receive the same content without interfering with one another.

One or more Compatible Handsets 114 are used by customers. For the handsets 114 to be compatible with a Broadcast-Capable Distribution Network 104, the handsets 114 must have capabilities to access the Broadcast channels and must also be content-compatible with the Controller 108 and the Content Provider System 102. This latter functionality typically includes means to signal control information to the functional blocks in the network, and to decrypt the content being transmitted. Typically, the handsets 114 also have the ability to access conventional cellular channels.

The Controller 108 is a central network functionality that interacts with the Network Operator to receive programming information and then disseminates this information to the Content Distribution System and the Network Processing Framework in the Broadcast-Capable Distribution Network 104 for the proper set up of the bearers. It also generates and distributes the Program Guide through which the users can select the content that they want to consume. It is responsible for authenticating users as well as for providing them with any information needed to decrypt the content. Additionally, the Controller 108 participates in the collection of records for billing purposes.

An Authenticate, Authorize, and Accounting (AAA) framework 116 is owned by the Network Operator and stores user information like service profiles and authentication data.

A Charging and Billing System 118 is used by the Network Operator to collect usage information so that the User can be correctly billed.

In addition to the in-band broadcast/multicast technologies listed above, some other OTA multicast technologies have been proposed. These technologies are known as out-of-band multicast technologies, and require a wireless network separate from the cellular network and typically are dedicated to the distribution of multicast content. These technologies include MediaFLO, whose specifications are made available at http://www.floforum.org, and Digital Video Broadcasting—Handheld (DVB-H), whose specifications are made available at http://www.dvb.org. These multimedia distribution systems send content to a user device using dedicated spectrums and separate physical interfaces and networks. Unlike the cellular networks, these dedicated networks are often only able to distribute content from the network to the user. Also, these technologies typically use a high level architecture that includes similarly functional elements as those for the in-band multicast technologies described above.

While multicast is well suited for some multimedia services, there are many other services that are best provided with a unicast transmission to a user. These include network-mobile services like video-on-demand (VOD) as well as mobile-mobile services like Video Telephony. Frameworks and technologies have been developed to support, create, and manage unicast multimedia services.

Once such framework is the IP Multimedia Subsystem (IMS) network architecture that specifies standard SIP and Diameter-based Interfaces between functional entities like Application Servers. Call/Service Control Functions, Home-Subscriber Servers, IMS Terminals etc. The specification of the SIP and Diameter protocols are made available at http://www.ietf.org and comprise a number of specifications that include IETF RFC 3261, IETF RFC 2327, and IETF RFC 3558. The IMS network architecture is defined but "IP Multimedia Subsystem, Stage 2, 3GPP TS 23.228," and other specifications available at http://www.3gpp.org, and is incorporated in this description by reference. The IMS architecture has also been defined by 3GPP2 in "All-IP Core Network Multimedia Domain, 3GPP2 X.S0013-000-0" and other specifications available at http://www.3gpp2.org. Within the 3GPP2 standard specifications, the IMS architecture is referred to as Multimedia Domain (MMD) architecture.

Referring to FIG. 2, an IMS network 200 ("3GPP IMS network") implemented in accordance with the IMS network architecture as defined by "IP Multimedia Subsystem, Stage 2, 3GPP TS 23.228," employs a peer-to-peer model of communication, which is suitable for unicasting information. The 3GPP IMS network 200 of FIG. 2 includes a number of functional components each configured to inter-operate in the IMS network architecture as defined by "IP Multimedia Subsystem, Stage 2, 3GPP TS 23.228." The functional components of the 3GPP IMS network 200 include a home subscriber server 202 (HSS), a subscriber location function 204 (SLF), call session control functions 206 (CSCF), an IMS application server 208 (AS), and a media resource function (MRF). Other functional components (not shown) can be included in the 3GPP IMS network 200. Each functional component can be implemented in one or more network entities (i.e., physical nodes) of the 3GPP IMS network 200. Each 3GPP IMS network entity can implement one or more functional components. The IMS network architecture also defines other components (in addition to the ones listed above) which are not described in this description.

The HSS 202 is a database that contains the user profile data, such as subscription-related information, and performs authentication, authorization, and accounting functions.

The SLF 204 is an optional functional component of the 3GPP IMS network 200 that is used when multiple HSSs 202 are deployed in the 3GPP IMS network 200. Both the HSS 202 and the SLF 204 implement the Diameter Base Protocol (details of which are provided in "IETF RFC 3588," available at http://www.ietf.org, and is incorporated in this description by reference). The SLF 204 includes a table that maps each IP address of a user device (illustratively depicted as an IMS-Enabled Mobile Station 210) to the specific HSS 202 storing information for that user device.

The CSCF 206 processes Session Initiated Protocol (SIP) signaling packets in the 3GPP IMS network 200. There are generally three types of CSCFs 206 in the 3GPP IMS network 100, namely: (1) the Proxy-CSCF (P-CSCF), which is the first point of contact between an IMS-Enabled Mobile Station 210 and the 3GPP IMS network 200, provides some security functions, and interacts with the HSS 120 to authenticate the IMS-Enabled Mobile Station 210 and to determine the service capabilities that the IMS-Enabled Mobile Station 210 is authorized to access; (2) the Interrogating-CSCF (I-CSCF), which serves as an intermediate SIP router; and (3) the Serving-CSCF (S-CSCF), which performs both SIP routing as well as session control.

The AS 208 hosts and executes services (e.g., push-to-talk and instant messaging), and interfaces with the S-CSCF using SIP. Depending on the array of multimedia services supported by the 3GPP IMS network 200, there can be any number of AS deployed in the 3GPP IMS network 200. The term "AS" 208 refers to the union of the multiple AS deployed in the 3GPP IMS network 200.

The MRF provides media streams to the user devices. The MRF includes a controller 212 (MRFC) and a processor 214 (MRFP). The MRFC 212 works on the control plane and does media related signaling in order to initiate, manage, and terminate streams and programs. The MRFC 212 receives instructions from the AS 208 and interprets them to the MRFP 214. The MRFP 214 works on the data plane, and provides the functionality to collect the content, to prepare it for distribution in the appropriate formal that can be understood by the user devices, and to stream the multimedia content to the user devices.

The IMS Enabled Mobile Stations are SIP-capable handsets that implement-IMS capabilities and can therefore communicate with a IMS network. Specifically, the handsets implement functionality like IMS Registration, communication with CSCF and AS entities etc.

SUMMARY

In one aspect, the invention features a method that includes enabling a network entity to control delivery of information to user devices over bearer paths, the bearer paths comprising unicast channels and multicast channels.

Implementations of the invention may include one or more of the following.

The method of enabling may include provisioning a multimedia service so that one or more multimedia programs are available for delivery to the user devices. For each of the one or more multimedia programs, the provisioning may include receiving program-related parameters, network-related parameters, and user-related parameters from a network operator. The provisioning may include adding the one or more multimedia program to a list of multimedia programs available for delivery to the user devices.

The method of enabling may include generating a program guide that provides a list of multimedia programs available for delivery to the user devices.

The method of enabling may include sending to a distribution network control information for use in setting up the bearer paths with the user devices.

The method of enabling may include sending to at least one of the user devices a program guide that provides a list of multimedia programs available for delivery. The program guide may be sent upon registration of the at least one of the user devices with a distribution network. The program guide may be sent in response to a program guide request by the at least one of the user devices. At least one of the user devices is associated with a service profile that identifies one or more multimedia services the user device has access to.

The method of enabling may include receiving a request for a program from at least one of the user devices, and identifying a transport mode associated with the requested program, the transport mode being one of unicast or multicast. If the identified transport mode is multicast, the method of enabling may include determining whether the requested program is currently being delivered over a multicast channel to which the at least one of the user devices has access, and if so, sending information to the at least one of the user devices to enable the at least one of the user devices to extract the requested program from that multicast channel. If the identified transport mode is multicast, the method of enabling may include determining whether the requested program is currently being delivered over a multicast channel to which the at least one of the user devices has access to, and if not, sending a notification to another network entity to start delivering the requested program over a multicast channel to which the at least one of the user devices has access. The method of enabling may include retrieving a service profile associated with the at least one of the user devices; and taking an action based on the retrieved service profile. Taking an action may include one or more of the following: determining whether the at least one of the user devices is capable of accessing the requested program; and identifying a quality of service the at least one of the user devices is subscribed to receive.

The method of enabling may include maintaining a count of a number of user devices to which a program is being delivered over unicast channels; and dynamically establishing a multicast channel when the count exceeds a threshold value. The method of enabling may include sending a notification to another network entity to start delivering the program over the newly-established multicast channel; and sending information to the user devices to enable the user devices to extract the program from the newly-established multicast channel.

The bearer paths may be set up over a plurality of distribution networks, the distribution networks using different access technologies. The bearer paths may include unicast channels and the distribution networks may include a Global System for Mobile Communications (GSM) network, a General Packet Radio Service (GPRS) network, a Universal Mobile Telecommunications System (UMTS), an Evolution-Data Optimized (EV-DO) network, a High-Speed Downlink Packet Access network, and a High-Speed Uplink Packet Access network. The bearer paths may include multicast channels, and the distribution networks may include a cellular multicast network that comprises a Code Division Multiple Access (CDMA) network implementing a Broadcast-Multicast Service (BCMCS) service, and a Global System for Mobile Communications (GSM) network implementing a Multimedia Broadcast/Multicast Service (MBMS) service; a broadband wireless network that comprises a Worldwide Interoperability for Microwave Access (WiMAX) network, and a Wireless Broadband (WiBro) network; a wireless multicast network that comprises a MediaFLO network, a Digital Video Broadcasting—Handheld (DVB-H) network, and a Digital Multimedia Broadcasting network (DMB); and a wired network that comprises a Digital Subscriber Line (DSL) network, a Gigabit Ethernet network, a Frame Relay network, and a cable network.

The bearer paths used to deliver a multicast service to the user devices may originate at one of the user devices.

The network entity can be configured to interoperate in one of a 3GPP Internet Protocol Multimedia Subsystem (IMS) network architecture and a 3GPP2 Multimedia Domain (MMD) network architecture. The network entity may provide functionality of a modified 3GPP2 Broadcast and Multicast Service (BCMCS) controller component configured to enable BCMCS signaling protocol transactions to occur over interfaces of one of a 3GPP IMS network architecture and a 3GPP2 MMD network architecture.

The method of enabling may include performing 3GPP2 BCMCS service discovery and announcement functionality by generating a program guide and delivering the program guide to the user devices.

The method of enabling may include performing 3GPP2 BCMCS content subscription and information functionality by authenticating and authorizing the user devices and delivering encryption keys and control information in a way compatible to 3GPP2 BCMCS transactions performed over interfaces of one of the 3GPP IMS network architecture and the 3GPP2 MMD network architecture.

The method of enabling may include performing 3GPP2 BCMCS content delivery functionality by having a MRFC functional entity of one of the 3GPP IMS network architecture and the 3GPP2 MMD network architecture send control information to a MRFP functional entity of one of the 3GPP IMS network architecture and the 3GPP2 MMD network architecture so as to enable content to be sent content to user devices through a distribution network.

The method of enabling may, include performing 3GPP2 BCMCS controller discovery functionality by having a S-CSCF functional entity of one of the 3GPP IMS network architecture and the 3GPP2 MMD network architecture send user requests to a network entity.

The method of enabling, may include performing 3GPP2 BCMCS accounting functionality by having an HSS functional entity of one of the 3GPP IMS network architecture and the 3GPP2 MMD network architecture collect accounting records in a manner compatible with BCMCS transactions performed over the interfaces of one of the 3GPP IMS network architecture and the 3GPP2 MMD network architecture.

The method of enabling may include performing 3GPP2 BCMCS subscription profile manager functionality by having a network operator configure user subscription information in a HSS functional entity of one of the 3GPP IMS network architecture and the 3GPP2 MMD network architecture.

An interface between a 3GPP2 BCMCS controller and a user device may be implemented with a SIP Interface between the network entity and the user device; an interface between a 3GPP2 BCMCS controller and a broadcast serving node may be implemented with a Mb Interface; an interface between a 3GPP2 BCMCS controller and a content server may be implemented with a Mp Interface; an interface between a 3GPP2 BCMCS controller and an authenticate, authorize, and accounting (AAA) server may be implemented with a Sh Interface; and an interface between a 3GPP2 BCMCS controller and a subscription profile manager may be implemented with a Sh interface, wherein each of the SIP Interface, Mb Interface, Mp Interface, Sh Interface is an interface of one of the 3GPP IMS network architecture and the 3GPP2 MMD network architecture.

In another aspect, the invention features a method that includes enabling a network entity configured to interoperate in one of a 3GPP Internet Protocol Multimedia Subsystem (IMS) network architecture and a 3GPP2 Multimedia Domain (MMD) network architecture to provide network-mobile multimedia services to user devices, wherein content associated with the multimedia services are stored in a plurality of storage devices in the network.

Implementations of the invention may include one or more of the following.

A bearer path used to deliver a multimedia service to the user devices may be established before an explicit service request is received from a user device. The method of enabling may include receiving from at least one of the user devices a request for authorization to access at least one of the multimedia services. The method may include establishing a multicast channel of a distribution network over which the content is simultaneously delivered to the user devices. The establishing may be performed by another network entity in response to a request for the content received from at least one of the user devices.

In another aspect, the invention features a method that includes providing a common interface through which a network operator defines service-specific parameters of a plurality of unicast and multicast multimedia-services deployed in a distribution network.

Implementations of the invention may include one or more of the following.

The service-specific parameters may be common to all programs associated with the multimedia service. The service-specific parameters may include one or more of the following: transport mode parameters, geographical area parameters, encryption mode parameters, quality of service parameters, network configuration parameters, security and access parameters, announcement parameters, and charging model parameters.

Through the common interface, the network operator may define program-specific parameters of a program associated with the multimedia service. The program-specific parameters may include one or more of the following: a program name, a program identifier, a program availability time, a program start time, a program end time, transport mode parameters, encryption mode parameters, quality of service parameters, application bit rate parameters, and user information that specifies a service profile associated with the program. One or more of the program-specific parameters may override corresponding one or more of the service-specific parameters.

Through the interface, the network operator may define information to generate a program guide that provides a list of programs available for delivery to user devices in communication with the distribution network.

Through the common interface, the network operator may define rendering parameters of a program guide to be displayed on user devices in communication with the distribution network, parameters associated with program guide delivery, and parameters associated with program guide geography.

The common interface may reside on a network entity that is configured to interoperate in a 3GPP Internet Protocol Multimedia Subsystem (IMS) network architecture or a 3GPP2 Multimedia Domain (MMD) network architecture.

In other aspects, corresponding computer programs and apparatus are also provided.

Advantages that can be seen in particular implementations of the invention include one or more of the following.

A new IMS functionality that combines IMS Application Server and Media Resource Function Controller functionality is provided on a multimedia controller. The multimedia controller delivers unicast and multicast services via multiple transport technologies including cellular unicast technologies (e.g., GSM, GPRS, UMTS, 1xEVDO), cellular multicast technologies (e.g., BCMCS, MBMS), broadband wireless technologies (e.g., WiMAX, WiBro), wireless multicast technologies (e.g., MediaFlo, DVB-H), and wired technologies (e.g., DSL, cable). The multimedia controller enables a dynamic switchover between unicast and multicast delivery modes, based on the number of users that request delivery of a particular program.

Although described in the context of an enhanced IMS network, the multimedia controller can be implemented in any number of network architectures to provide both unicast and multicast multimedia services over said networks.

The enhanced IMS network includes the capability to support a network-device model, which is used to enable delivery of network-generated multicast and unicast content to user devices.

The Service and Program Design Interface enables a network operator to configure service parameters and programming schedules, and easily and efficiently disseminate the programming schedules to any network in which unicast and multicast multimedia services are supported. In those instances in which the Service and Program Design Interface is provided in the context of an enhanced IMS network, the interface enables the network operator to easily and efficiently convey program schedules to the multimedia controller for further dissemination to the distribution network and the content provider system.

The modified architecture for BCMCS implements the BCMCS protocols over interfaces of one of a 3GPP IMS network architecture and a 3GPP2 MMD network architecture. This allows the network operator to integrate BCMCS into their 3GPP IMS and/or 3GPP2 MMD architectures. To this end, the BCMCS interactions are modified to take place over the IMS/MMD Mp and Cx Interfaces. The role of the BCMCS Controller is redefined as a combined IMS/MMD Application Server and Media Resource Function Controller, called the multimedia (BCMCS) controller. This multimedia (BCMCS) controller is designed to serve multimedia to the users using both Multicast (BCMCS) as well as Unicast (regular 1xEVDO).

Particular implementations of the invention also provide network operators and users with the following IMS-related advantages: (1) it simplifies introduction of new unicast and multicast multimedia services; (2) it provides a standard architecture to create and maintain different kinds of unicast and multicast multimedia services; (3) it presents a common environment to a user to access multiple unicast and multicast services; and (4) it provides an access-agnostic way to a network operator to disseminate unicast and multicast multimedia content.

The details of one or more examples are set forth in the accompanying drawings and the description below. Further features, aspects, and advantages of the invention will become apparent from the description, the drawings, and the claims.

DETAILED DESCRIPTION

Multimedia Controller

Figure 3:
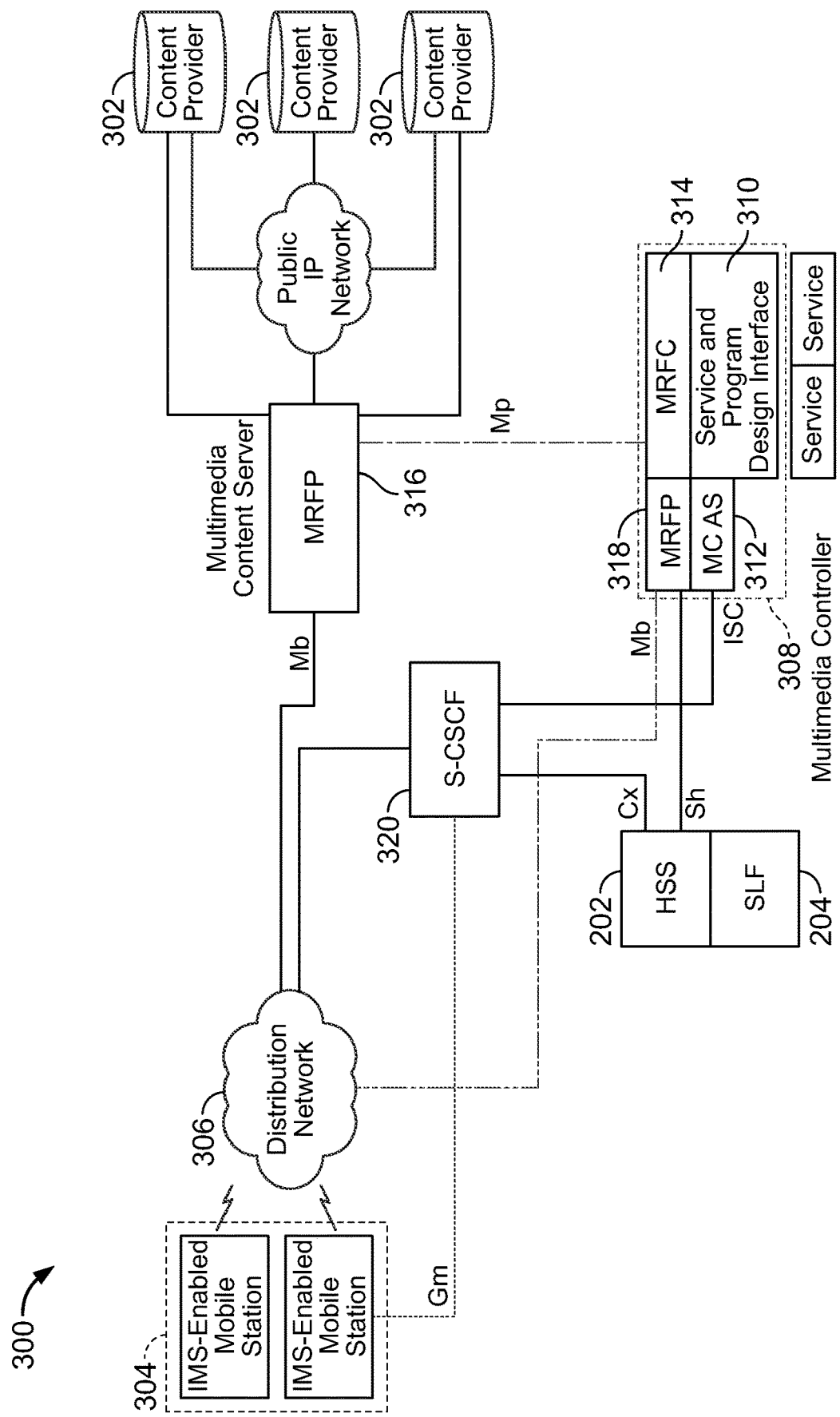
FIG. 3 is a block diagram of an enhanced IMS Network.

FIG. 3 shows an example network ("enhanced IMS network") 300 in which multimedia services generated by content providers 302 can be delivered to user devices (depicted as IMS-enabled mobile stations 304) through bearer paths of a distribution network 306. The bearer paths include unicast channels and multicast channels, and the distribution network 306 includes one or more of the following networks: a Global System for Mobile Communications (GSM) network, a General Packet Radio Service (GPRS) network, a Universal Mobile Telecommunications System (UMTS), an Evolution-Data Optimized (EV-DO) network, a High-Speed Downlink Packet Access network, a High-Speed Uplink Packet Access network, a Code Division Multiple Access (CDMA) network implementing a Broadcast Multicast Service (BCMCS) service, a GSM network implementing a Multimedia Broadcast/Multicast Service (MBMS) service, a Worldwide Interoperability for Microwave Access (WiMAX) network, a Wireless Broadband (WiBro) network, a MediaFLO network, a Digital Video Broadcasting—Handheld (DVB-H) network, a Digital Multimedia Broadcasting network (DMB), a Digital Subscriber Line (DSL) network, a Gigabit Ethernet network, a Frame Relay network, and a cable network.

The enhanced IMS network 300 includes a functional entity referred to in this description as a "multimedia controller" 308 that implements two functions, namely: (1) multimedia service and program provisioning; and (2) multimedia program delivery. Other functions may also be implemented by the multimedia controller 308.

Although described in the context of an enhanced IMS network, the Multimedia Controller can be implemented in any number of network architectures to provide both unicast and multicast multimedia services over said networks.

Multimedia Service and Program Provisioning

Figure 4A:
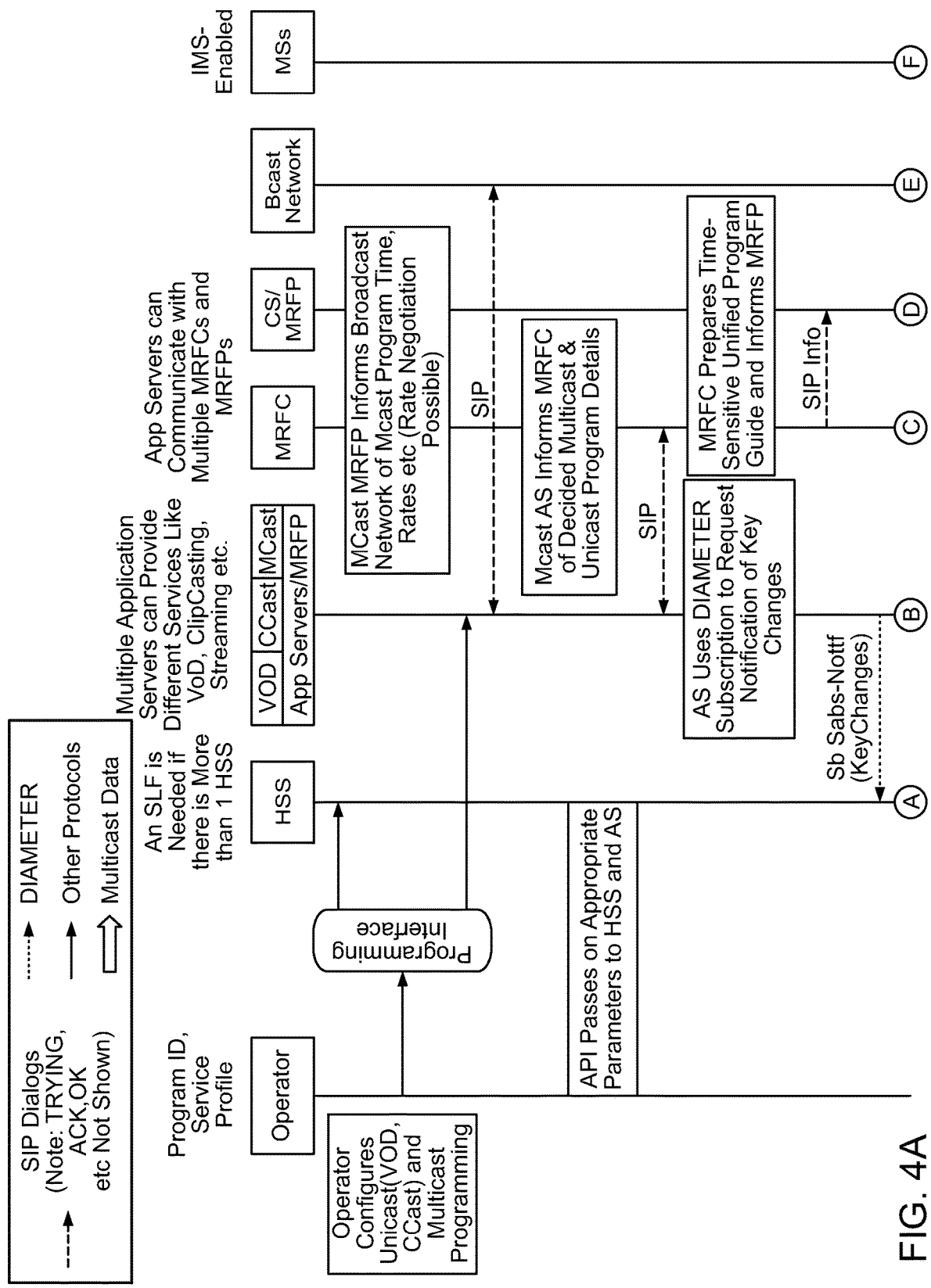
FIGS. 4-6 each shows a call flow.
Figure 4B:
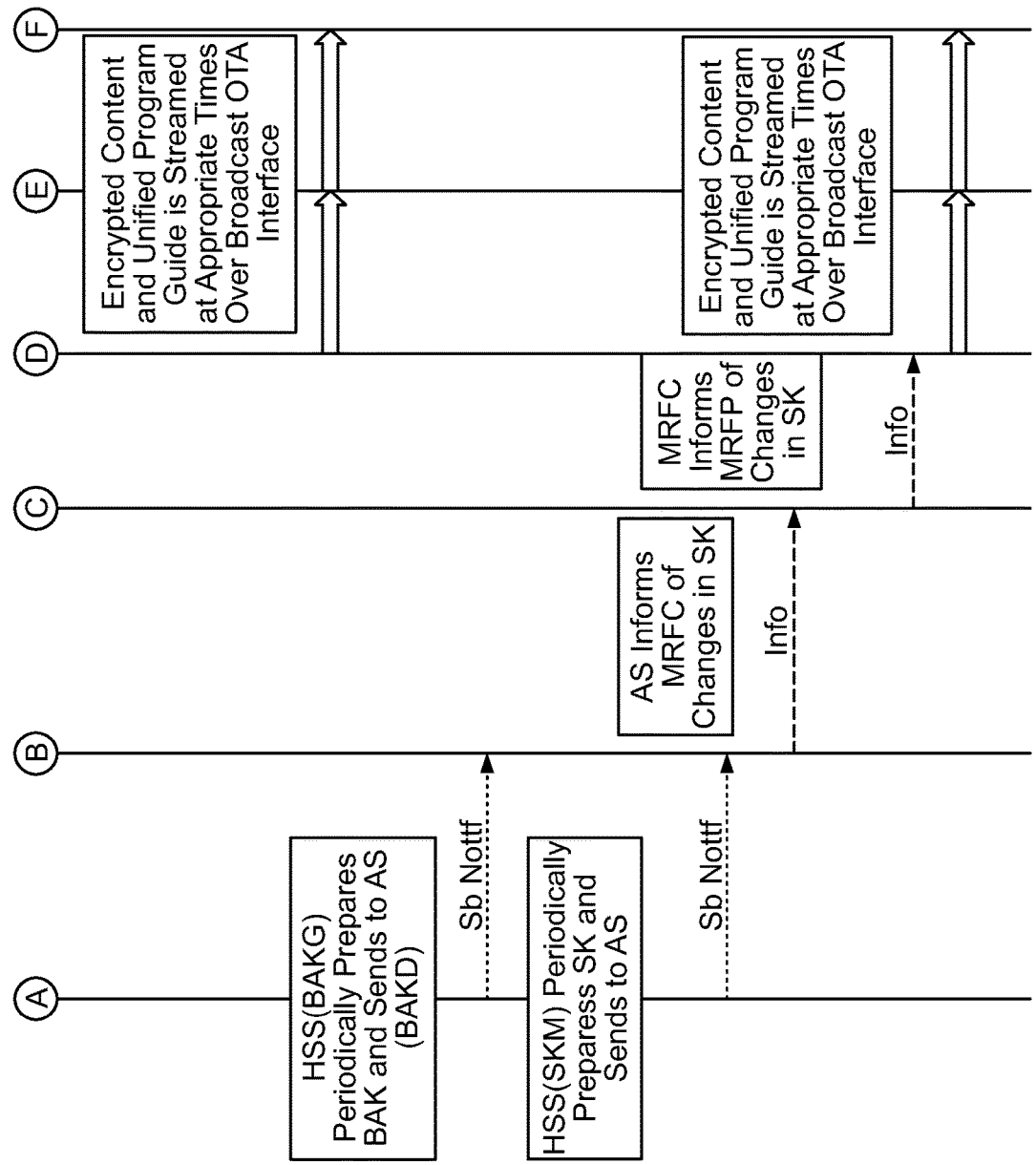

The multimedia controller 308 provides an interface through which an operator of the enhanced IMS network 300 provisions multimedia services and programs on a recurring basis (e.g., weekly) or as needed (e.g., when new programs need to be provisioned). In one example, the interface provided by the multimedia controller 308 is a "Service and Program Design Interface" 310 (details of which are described below) that runs on a server in the enhanced IMS network 3800. Referring also to the call flow of FIG. 4, for each program, the network operator enters a number of program-related parameters, an illustrative list of which is included below:

Program Name: Text string describing the name of the program

Program ID: An identifier which is used in communications between the AS and other entities Program Availability Time: When the program is available in the enhanced IMS network Program Start & End Time: Only applicable to programs to be multicasted Encryption details: Specifies which encryption mode is used and associated information Header Compression details: Specifies header compression parameters Application Bit Rate: The rate at which the content is to be sent Quality of service (QoS) Parameters: If the program has any QoS requirements Transport mode: Whether this program is to be streamed over a unicast channel, a multicast channel, or both Transport information: Based on the transport mode, this includes extra information like IP addresses, ports, geographical information etc.

User information: Specifies service profile associated with this program

Once the network operator has entered the relevant parameters, the interface 310 initiates communication with the AS-portion 312 of the multimedia-controller 308 and the HSS 202, and delivers the appropriate information to each. In one example, the interface 310 sends the HSS 202 the user-profile information to enable the HSS 202 to determine whether a particular user is allowed to access the program, and sends the rest of the information to the AS-portion 312 of the multimedia controller 308. The AS-portion 312 of the multimedia controller 308 sends the information it receives to the MRFC 314 to enable the MRFC 314 to generate or update a program guide that provides a time-sensitive listing of all multimedia programs that are available for delivery to the user devices. The MRFP 314 sends the program guide through the standard IMS Mp interface to the MRFP 316 at the multimedia content server, which in turn sends the program guide to the distribution network 306 for dissemination at regular intervals to the users. The MRFP 318 part of the multimedia controller 308 also uses the Mb interface to communicate program scheduling details to the distribution network 306 for use in establishing the bearer paths at the appropriate times (e.g., in the case of Network-Initiated broadcast).

Figure 5A:
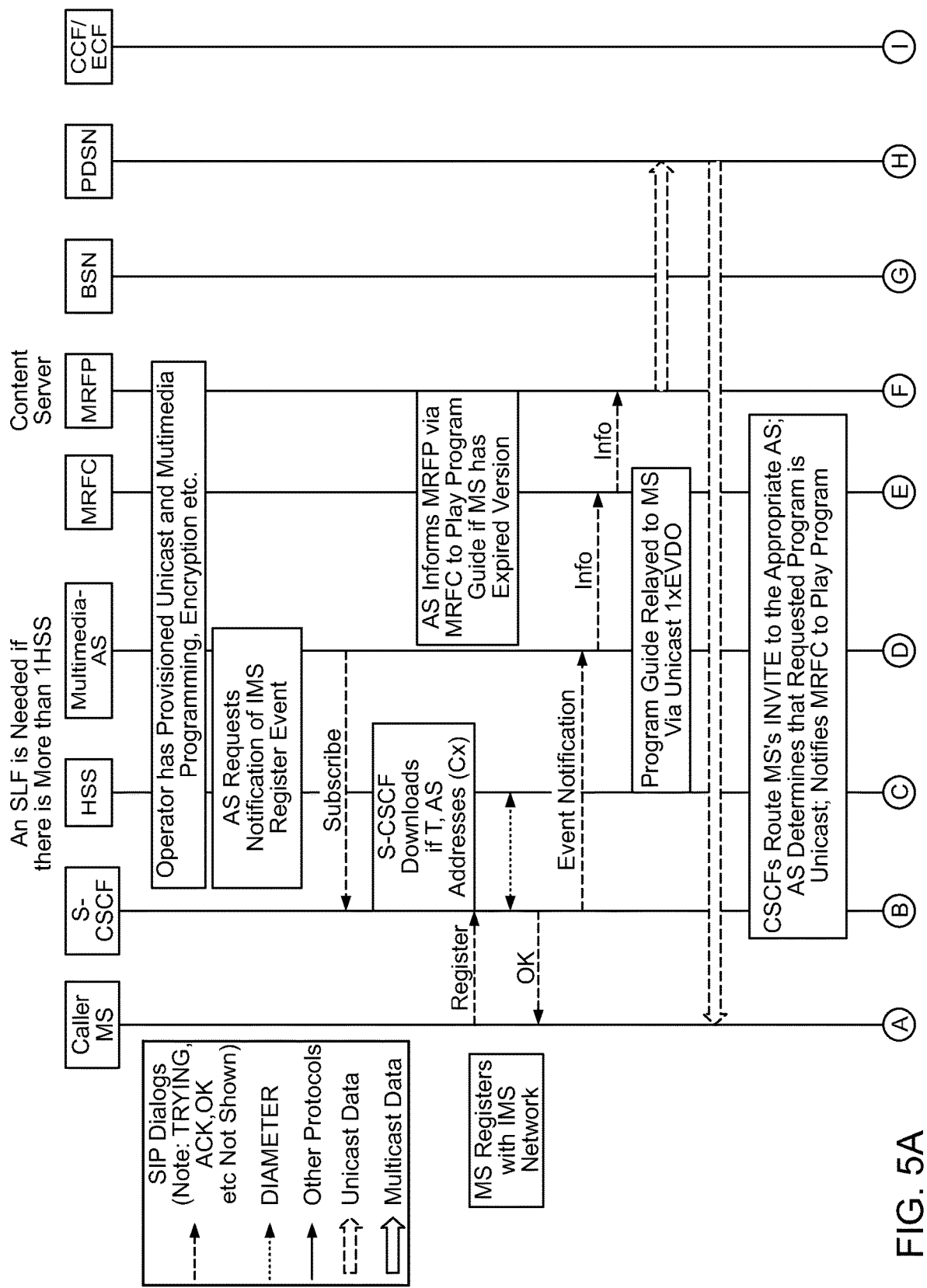
Figure 5B:
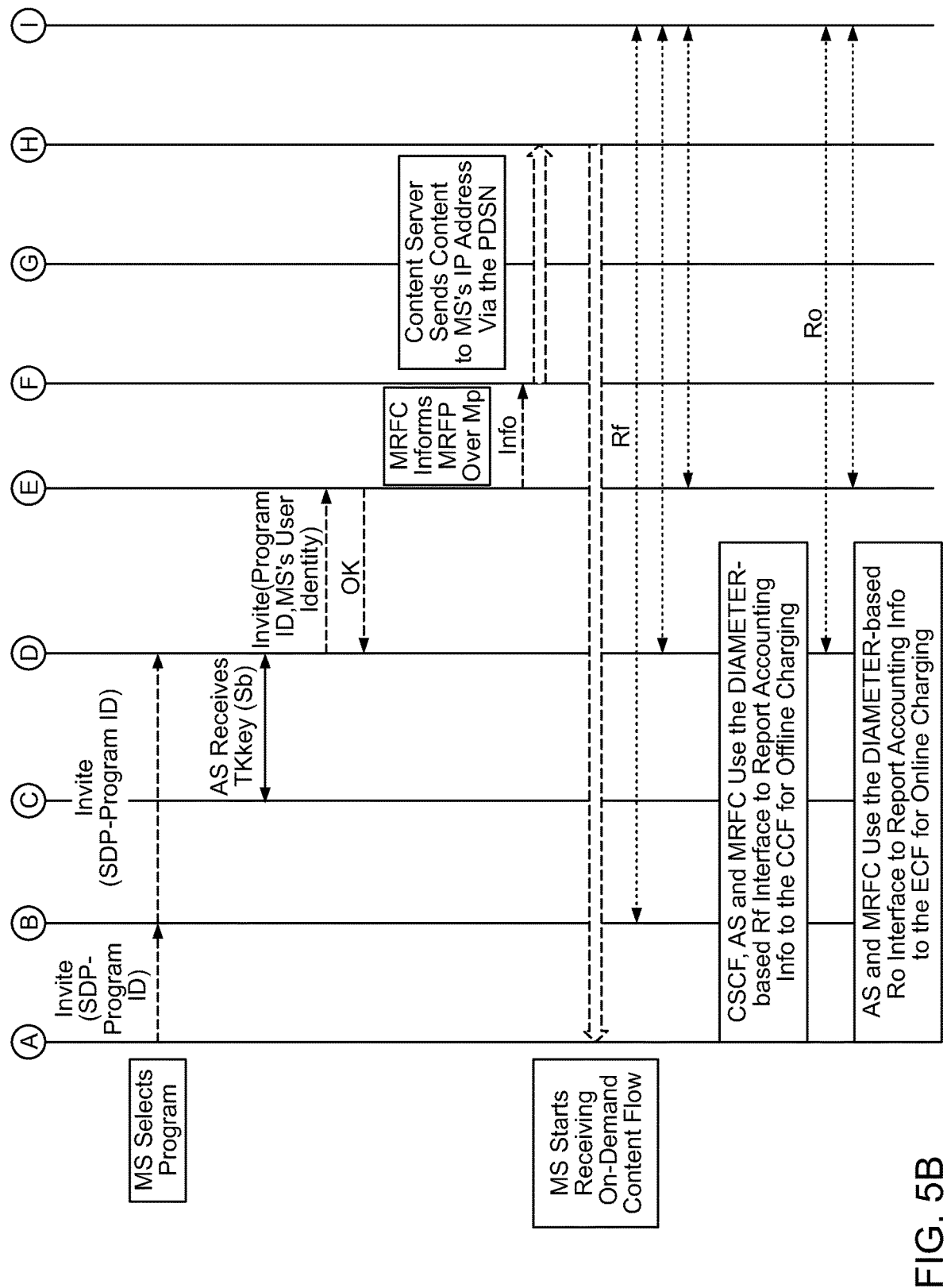

The program guide can be delivered to a user device upon IMS Registration. As part of standard IMS operation, initially the user device performs the IMS Registration process with the S-CSCF 320. This involves the S-CSCF 320 verifying the identity of the user device with the HSS 202 and downloading some user information (including a service profile) from the HSS 202. If the service profile indicates that the user can access multimedia programs, the program guide is automatically delivered to the user device. Once rendered on a screen of the user device, a user of the user device can request the delivery of a multimedia program by selecting one of the multimedia programs listed in the program guide. This request is routed through the distribution network, to the multimedia controller 308, which then takes either of the following actions based on the transport mode of the selected multimedia program:

Unicast mode: The multimedia controller 308 passes on the IP Address of the user device to the MRFP 316 at the multimedia content server so that it can sent the requested multimedia program directly to the user device. One example call flow in the context of a 1xEVDO distribution network is shown in FIG. 5. In this example, the MRFP 316 at the multimedia content server sends the content to the user device via a packet data serving node (PDSN) and a radio network controller (RNC).

Figure 6A:
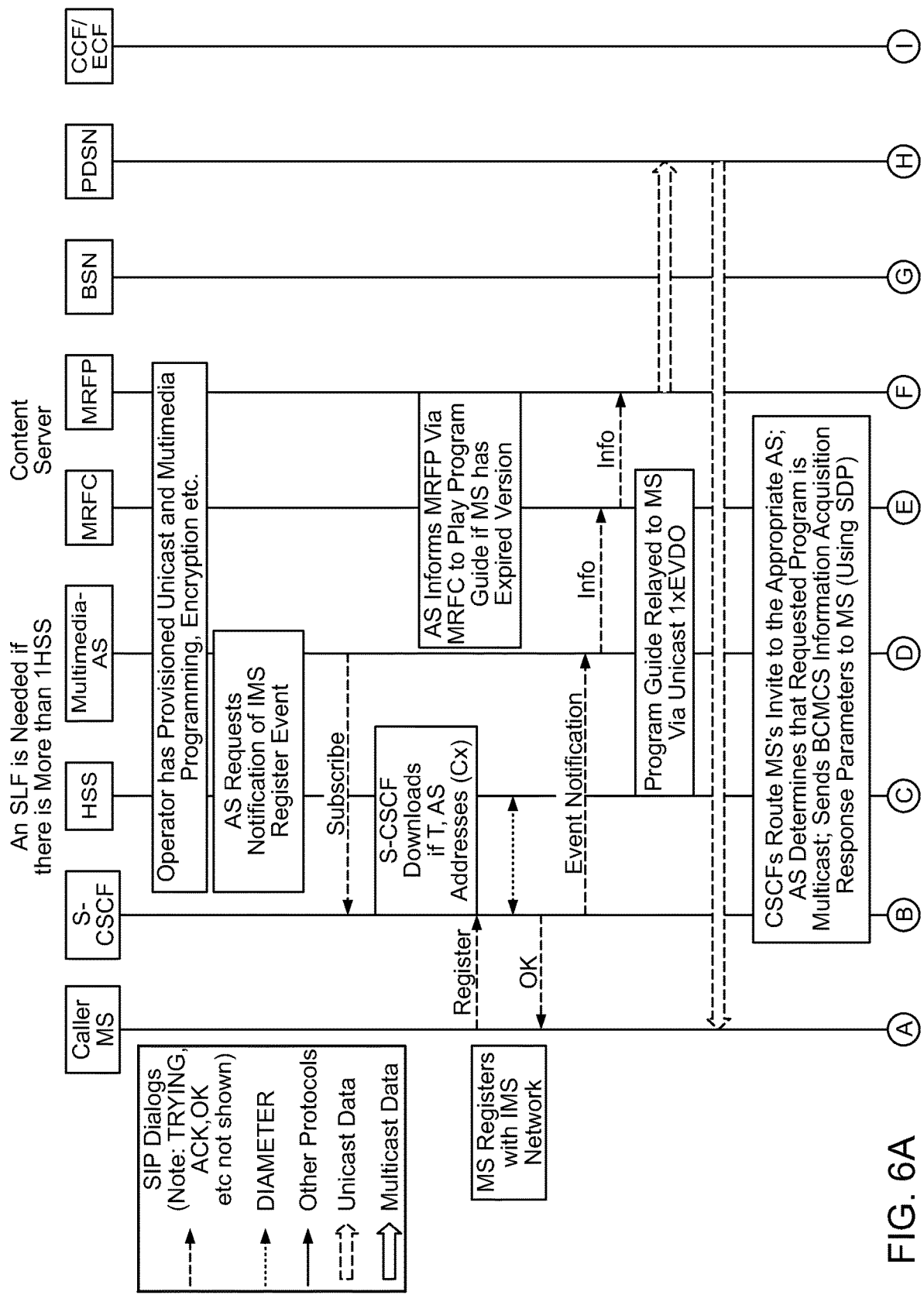
Figure 6B:
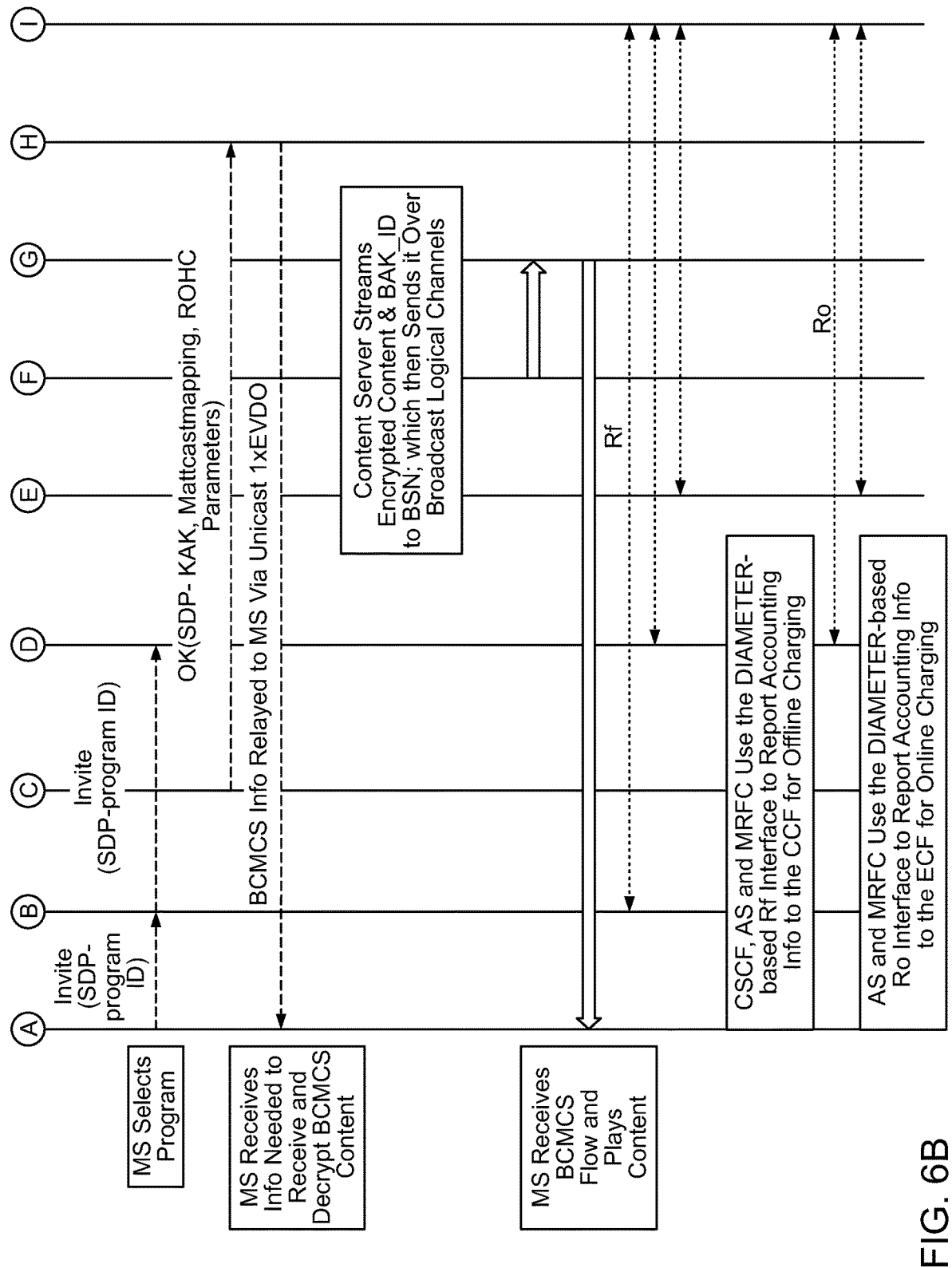

Multicast mode: The multimedia controller 308 sends information to the user device sufficient to enable the user device to extract the multimedia program from a multicast channel. One example call flow in the context of a 1xEVDO distribution network implementing a BCMCS service is shown in FIG. 6. In this example, the user device requires encryption keys, header compression parameters, and BCMCS Flow ID to Multicast IP Address mappings. Additional information concerning the BCMCS service is described in U.S. application Ser. No. 11/229,180 filed on Sep. 15, 2005, and incorporated by reference.

The program guide can also be delivered to a user device in response to a specific program guide request received from a user device, or as part of a periodic broadcast to update user devices with the latest program guide. When rendered on a user device, the program guide provides the list of multimedia programs that are available for selection by the user device. This list includes all programs that have been provisioned regardless of the transport mode (i.e., the list includes programs to be unicasted and programs to be multicasted).

In those instances in which the HSS 202 is required to act as a key generator (e.g., BCMCS requires periodically-updated Broadcast Access Key and Short-Term Keys), the AS 312 subscribes to an event-notification feature of the HSS 202 so as to be notified when the key(s) change. When the AS 312 receives the new keys, the AS 312-conveys them to the MRFC 314 and the MRFP 318 so that the multimedia program can be accurately encrypted.

The multimedia controller 308 registers for IMS event notification with the S-CSCF 320. This action ensures that the multimedia controller 308 is notified whenever a user device, whose service profile includes access to multimedia services/programs, registers with the S-CSCF 320.

In other examples, the program guide is generated by an AS other than the AS-portion 312 of the multimedia controller, and the functionality to render the program guide is provided by the MRFP 316 at the multimedia content server. Although the description above provides for a user selection of a multimedia program by way of a program guide, in other examples, the user selects the program through other means, for example, by accessing a known website.

Multimedia Content Delivery

Multimedia content can be delivered to user devices using either or both of the following transport modes:

Unicast streaming: the program is sent over a unicast channel to an individual user device. Typically, the program is delivered in response to a specific request received from the user device.

Multicast streaming: the program is sent offer a broadcast channel and can be accessed by a large number of user devices simultaneously. In some instances, the program is delivered regardless of the presence of user devices in a sector. In some instances, the program is delivered on demand based on user activity.

The multimedia controller 308 and the user devices are aware of the transport mode with which the program is delivered. However, users of the respective user devices are unaware of the actual transport mode of the multimedia program, and do not experience any change in user experience based on the transport mode. That is, the same user experience is achieved regardless of the transport mode.

FIGS. 5 and 6 show example call flows associated with multimedia content delivery. The sequence of events includes:

1. The user device already has a program guide, which lists all multimedia programs available for delivery in the geographic area in which the user device is located. The term "geographical area" indicates a terrestrial region—this could be a cell sector, a combination of many sectors, a city, a state or a country.
2. The user of the user device selects a program from the program guide.
3. This request is conveyed to the AS-portion 312 of the multimedia controller by the CSCFs 320.
4. The multimedia controller 308 uses the IMS Sh Interface to communicate with the HSS 202 to determine if the user device can access the selected program. The multimedia controller 308 also retrieves the service profile associated with the user device which indicates, among other things, the level of QoS that the user device is subscribed to receive.
5. If the transport mode of the selected program is designated as unicast, the multimedia controller sends the IP address of the user device, program rate and QoS settings to the MRFC 314, which passes them on to the MRFP 318 at the multimedia content server.
6. The MRFP 316 at the multimedia content server delivers the selected program to the user device over a unicast channel of the distribution network.
7. If the transport mode of the selected program is designated as multicast and is currently being multicasted, the AS-portion 312 of the multimedia controller simply conveys some information (in the case of BCMCS, the information includes encryption keys, header compression parameters, and BCMCS FlowID to Multicast IP Address mappings) to the user device to enable the user device to extract the program from the appropriate multicast channel of the distribution network and decrypt the extracted program.
8. If the transport mode of the selected program is designated as multicast, is not currently being multicasted, and the enhanced IMS network permits user-initiated multicasting, the AS-portion 312 of the multimedia controller establishes the multicast channel of the distribution network and informs the MRFP 316 at the multimedia content server to begin delivering the selected program over the newly-established multicast channel.

In some implementations, the multimedia controller 308 maintains a count of a number of user devices to which a program is being delivered over unicast channels of a single unicast network. The multimedia controller 308 dynamically establishes a multicast channel when the count exceeds a predefined threshold value, sends a notification to the MRFP 316 at the multimedia content server to start delivering the program over the newly-established multicast channel, and sends information to each of the user devices to enable the user devices to extract the program from the newly-established multicast channel. In so doing, if more user devices request the same program, the enhanced IMS network 300 can deliver the program in a more efficient manner to reduce the demands on the network bandwidth capacity Network-Device Model As previously discussed, the IMS network architecture as currently defined by "IP Multimedia Subsystem, Stage 2, 3GPP TS 23.228," implements a peer-to-peer model. In a peer-to-peer communication, a specific user device explicitly initiates a communication with another user device by requesting the IMS network to establish a point-to-point connection. In such instances, the 3GPP IMS network creates connection between the two user devices, and one of the user devices provides the content or media that is sent to the other of the user devices.

The enhanced IMS network 300 is implemented to support a network-device model that enables the network 300 to deliver network-provided multicast content to the handsets. In such instances, the network 300 may establish the bearer path without an explicit request from a user device, or the bearer path may be established upon a request by the user device. After the bearer path is created, a user device accesses the bearer path to receive the associated content. Typically, in order to access the bearer path, the user device requests certain functional entities in the network 300 for authentication and access authorization. The bearer path can also be created as a response to a request by a user device for a specific program. In this case, depending on network operator provisioning, the bearer path may be unicast or multicast. If, after a unicast bearer has been created, other user devices request the same program, the network 300 is implemented with functionality that supports a dynamic switchover from a unicast mode of delivery to a multicast mode of delivery, as the latter is more efficient.

The content to be multicasted can be a multimedia program (e.g., a Television program, a video program, a radio program, a music distribution service, a pod cast, a program guide that provides a listing of multimedia programs available for delivery to the user devices, an advertisement, a network-related message, or an emergency alert message) accessible by the MRFP 316 at the multimedia content server.

The enhanced IMS network 300 supports all multimedia services, both unicast and multicast, and inherits the benefits of the 3GPP IMS framework including rapid creation of new services, and unified management of all services.

Although the enhanced IMS network 300 provides the content, the consent may originate (i.e., be generated) at a user device. Since the user terminal does not have the capability to multicast the content, multicasting can be achieved by sending the content to a server in the enhanced IMS network 300, which in turn provides it to a desired group of user devices. Two example services in which such techniques would be useful is a push-to-talk service with multicast delivery and a push-to-media service with multicast delivery.

Service and Program Design Interface

In one implementation, the multimedia controller 308 provides a Service and Program Design Interface 310 that enables a network operator to easily and efficiently define each multimedia service supported by the enhanced IMS network 300, and define each program associated with a multimedia service supported by the enhanced IMS network 300. Once the multimedia services and programs are defined, the interface 310 is configured to generate a program guide which is delivered to the user devices and used by the user to select the programs, and also contains information that is used in establishing bearer paths in the distribution network 306.

Through the interface 310, the network operator can define parameters that are common to all programs that are associated with a specific multimedia service. Examples of such service-related parameters include:
Transport parameters: the way the service is delivered (multicast, unicast, or a combination of unicast and multicast), encoding/encryption specifications, Quality of Service requirements, etc.
Network configuration parameters: based on the transport mode, these network configuration parameters provide extra information such as IP addresses, ports, geographical information, etc.
Security and access parameters
Announcement parameters: how the program guide is to be constructed, where the program guide is to be located, how frequently the program guide is updated, how the program guide is delivered, etc.
Charging and billing parameters: how the network operator collects usage information so that the user device can be correctly billed Through the interface 310, the network operator can also define parameters that are specific to a particular program. Examples of such program-related parameters include a program name, a program identifier, a program availability time, a program start time, a program end time, transport mode parameters, encryption mode parameters, quality of service parameters, application bit rate parameters, and user information that specifies a service profile associated with the program.

Generally, in those instances in which the program-related parameters conflict with the service-related parameters, the program-related parameters take precedence and override the service-related parameters.

In addition, the interface 310 enables a network operator to easily and efficiently set up program schedules (for example details like Program Name, Time, Bit Rate etc) to the multimedia controller 308 for further dissemination on to the distribution network 306 and the content provider system 302.

The following is an example scenario in which the network operator interacts with the Service and Program Design Interface 310 to define a service:
1. Define program guide rendering. Parameters that are defined in this step include:
    The geometry of how the program guide is rendered, such as how channels are displayed and how the time and is rendered.
    Common elements to be rendered in the program guide, such as channel logos.
    Where the information needed to build the program guide is stored, how that information is read, and whether a parser is used to read that information.
    The exact behavior of the program guide during channel selection (e.g., the selected program gets highlighted)
    Other rendering information, which may be customized to each type of mobile device supported by the network.
    The program guide may also include other services such ticker services, which are also defined in this step.

2. Define program guide delivery method, such as unicast, multicast, or a combination of the two. Certain portions of the program guide may be delivered only once using unicast or multicast (for example, common elements that are not time sensitive), while other elements maybe delivered periodically (in the latter case, define the period of time).
3. Define program guide geography. Certain selections may be displayed only in certain geographical areas.
4. Define service access/security. Access to content may depend on the type of subscription, or on type of content. Premium and basic packages of program may be defined, each corresponding to different access rights. The composition of each program package may depend on geography.
5. Define billing and charging models. Possible models include: flat rate, pay-per-volume, pay-per-view, pay-per-program, etc.

Once a service is defined, individual programs associated with the service can be provisioned, and subsequently delivered to the user devices. The provisioning of each individual program includes the program specific parameters described above, and a specification on how the enhanced IMS network 300 is to handle errors.

Although described in the context of an enhanced IMS network 300, the Service and Program Design Interface 310 can be implemented in any number of network architectures and provided by any number of different network components.

Modified BCMCS Controller

3GPP2 has produced a technical specification "Broadcast and Multicast Service in cdma2000 Wireless Network." 3GPP2 X.S0022-0, available at http://www.3gpp2.org, that described a framework called Broadcast-Multicast Services (BCMCS) over a 1xEVDO network. This technical specification describes the interfaces between access terminals, access network, external entities such as a content server, an AAA (authentication, authorization, and accounting) server, a subscription profile manager, and a BCMCS controller.

Figure 7:
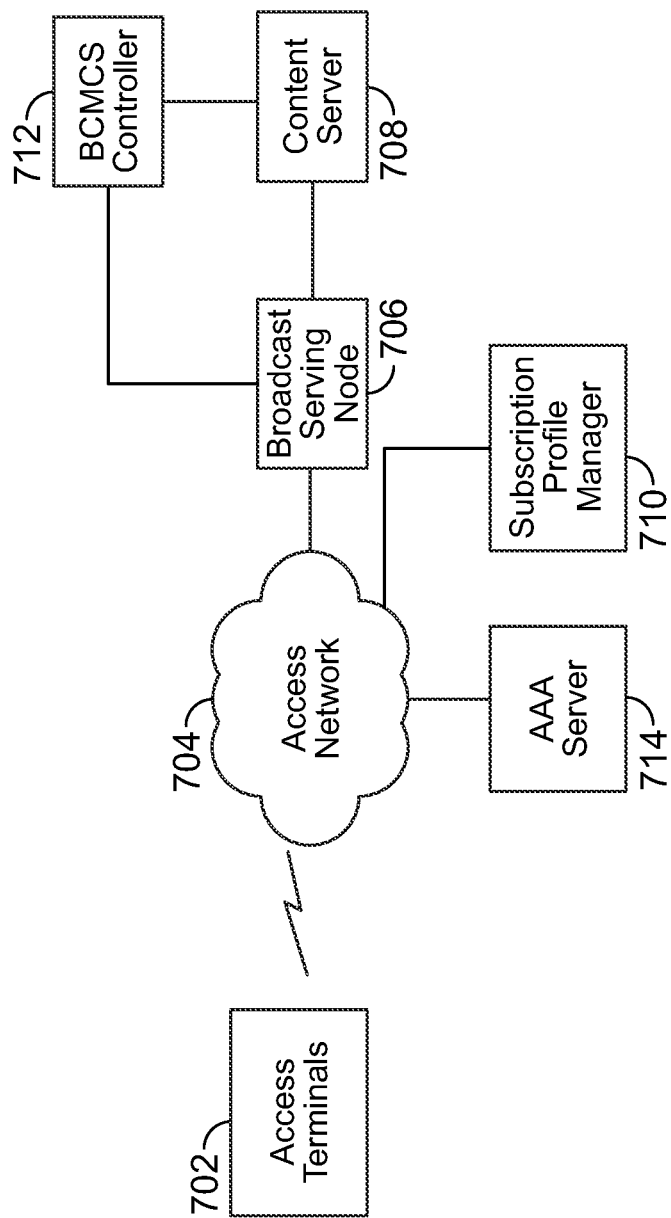
FIG. 7 is a block diagram of a 3GPP2 BCMCS Network.

Referring to FIG. 7, the access terminals 702 are 1xEVDO handsets that are BCMCS-capable. These mobile stations 702 have the ability to access BCMCS channels in the access network 704, and typically include the ability to play audio/video streams on a viewer of the access terminal 702. The access network 704 is a 1xEVDO-Radio Access Network augmented with BCMCS capabilities. The access network 704 provides the access terminals 702 with IP connectivity and provides the bearer paths for the BCMCS content packets. The access network 704 typically includes a broadcast serving node 706 that implements various BCMCS protocols (e.g., Broadcast Framing Protocol and Broadcast MAC Protocol), and is responsible for establishing the multicast bearer path in the access network 704. The content server 708 interfaces with the broadcast serving node 706 to provide content streams. The subscription profile manager 710 manages a subscription profile database, which contains user profiles for the subscribers. The BCMCS controller 712 implements a number of different functions including the following:

It provides the mobile stations with program information, encryption keys, header compression parameters and any other data the mobile stations need to recover the higher-layer packets.
It provides the broadcast serving node with the program schedule.
It provides the content server with the program schedule.
It interacts with the AAA server 714 to authenticate the user device and to upload billing records.

The 3GPP2 BCMCS framework enables a network operator to provide multimedia-broadcasting services using BCMCS-capable access networks and mobile stations. However, the 3GPP2 BCMCS framework is incompatible with the IMS network architecture defined by "IP Multimedia Subsystem, Stage 2, 3GPP TS 23.228."

To address this incompatibility, this description provides a modified architecture for the BCMCS controller in which BCMCS signaling protocol transactions over IMS interfaces are defined. Such a modified BCMCS controller enables the network operator to integrate BCMCS functionality into its existing IMS network. To this end, the BCMCS signaling protocol transactions are modified to take place over the IMS Mp and Cx interfaces, rather than the current RADIUS, XML interfaces.

Figure 8:
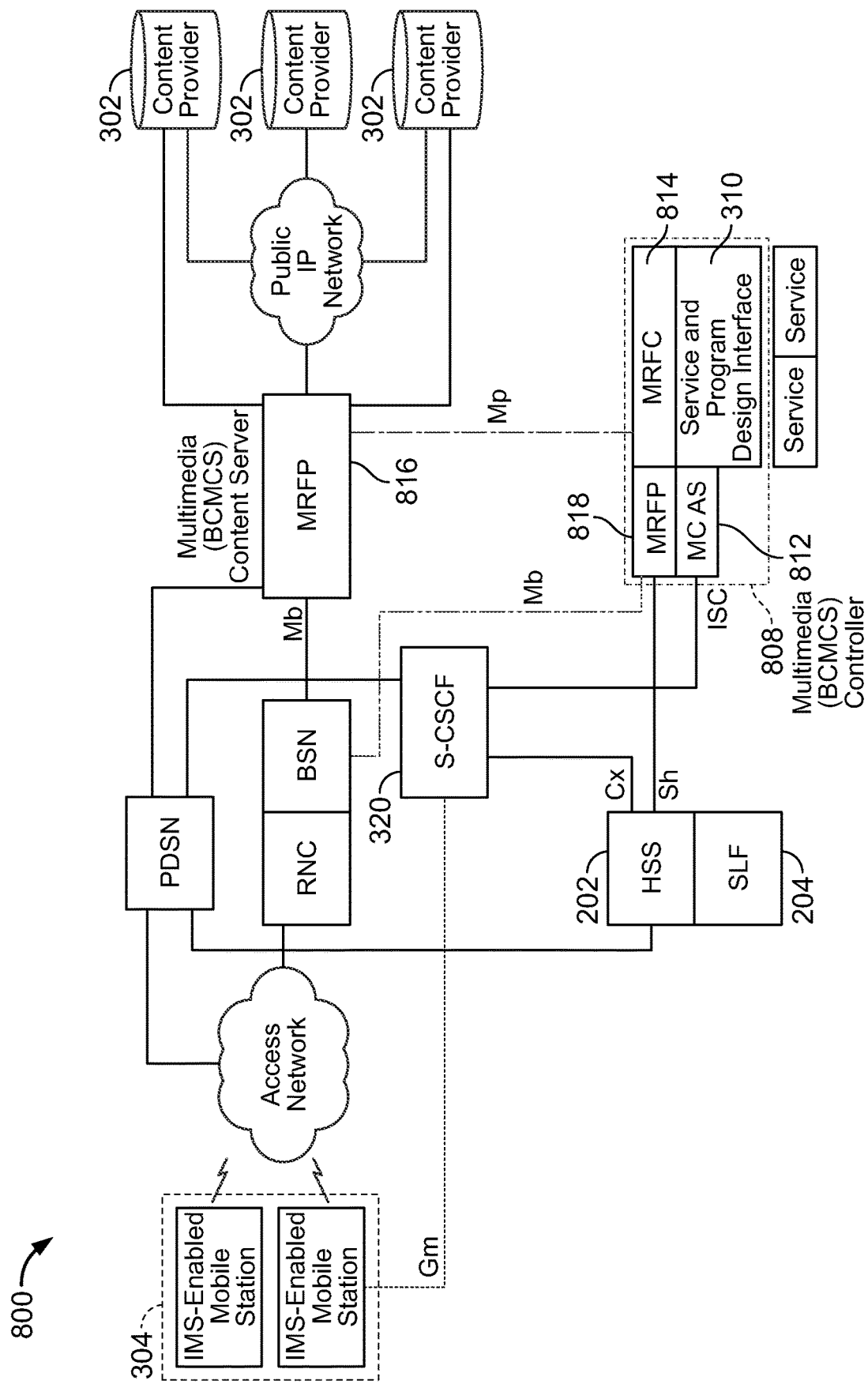
FIG. 8 is a block diagram of an adaptation of BCMCS to IMS.

In the implementation of an IMS network 800 depicted in FIG. 8, a single network entity referred to in this description as a "multimedia (BCMCS) controller" 808 includes the following functionality: the AS 812, the MRFC 814 (which corresponds to the 3GPP2 BCMCS Controller's function to convey program information to the MRFP 816 at the multimedia (BCMCS) content server), and some of the MRFP 818 functionality (which corresponds to the 3GPP2 BCMCS controller's function to provide the broadcast serving node with the program schedule so that the distribution network can set up the bearer path).

The multimedia (BCMCS) controller 808 controls the delivery of multimedia programs to user devices (illustratively depicted as IMS-Enabled Mobile Stations 804) through multicast channels (using the BCMCS techniques (described in U.S. application Ser. No. 11/229,180 filed on Sep. 15, 2005, and incorporated by reference) over the IMS interfaces) and through unicast channels (using regular 1xEVDO techniques). As all IMS interfaces are either SIP or Diameter-based, the Controller-CS and the Controller-BSN Interactions are now are part of the SIP-based Mp Interface and the Mb Interface respectively, and the Controller-AAA Interaction is now part of the Diameter-based Sh Interface. A description of BCMCS functionalities and their IMS equivalents is shown in Table 1.

TABLE 1

| BCMCS Functionality | Equivalent IMS Functionality |
| --- | --- |
| Service Discovery/ Announcement | Program Guide Generation and Delivery to MS by MC (AS, MRF) |
| Content Subscriptions/ Information Acquisition | MS interacts with MC (AS) to authenticate and authorize itself and receive encryption keys, mapping, etc. |
| Content Availability Determination | Handled by Access Network |
| Content Delivery | Interaction between MC (MRFC) and CS (MRFP) to send Content to BSN |
| Controller Discovery | S-CSCF routes MS's request to MC |
| Bearer Path Setup | Interaction between MC (MRFP) and BSN to set up bearer path |
| Accounting | Collection of records by AS, MRFP and upload of records to HSS |
| Subscription Profile Manager | Operator configures User subscription details on HSS; AS retrieves as needed |

A description of BCMCS Interfaces and their Equivalent IMS Interfaces is shown in Table 2.

TABLE 2

| BCMCS Interface | Equivalent IMS Interface |
|---|---|
| Controller-MS | SIP Interface between MS (SIP UAC) and MC (SIP UAS) |
| Controller-BSN | IMS Mb Interface |
| Controller-CS | IMS Mp Interface |
| Controller-AAA Server | IMS Sh Interface |
| Controller-Subscription Prof. Mgr | IMS Sh Interface |
| AN-MS | Handled by Access Network |

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray-tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback. e.g., visual feedback, auditory feedback, or tactile feedback, and input from the user can be received in any form, including acoustic, speech, or tactile input.

The techniques described herein can be implemented in a distributed computing system that a includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results.

What is claimed is:

1. A method performed by a network entity, comprising:
generating a program guide that provides a list of multimedia programs available for delivery to a user device, the program guide including a first portion comprising service-specific parameters common to all programs in the list and a second portion comprising program-specific parameters associated with at least one program in the list;
sending, from the network entity to the user device, the second portion of the program guide without sending the first portion of the program guide;
receiving, from the user device, a request for delivery of a multimedia program;
identifying a transport mode associated with the multimedia program, the transport mode indicating whether the user device will receive the multimedia program over a unicast channel or a multicast channel of one or more bearer paths; and
transmitting a communication that causes the user device to receive the multimedia program over a unicast channel or a multicast channel of the one or more bearer paths based at least in part on the identified transport mode.

2. The method of claim 1, further comprising:
provisioning a multimedia service so that one or more multimedia programs are available for delivery to the user device.

3. The method of claim 2, wherein the provisioning comprises:
for each of the one or more multimedia programs, receiving program-related parameters, network-related parameters, and user-related parameters from a network operator.

4. The method of claim 2, wherein the provisioning comprises:
adding the one or more multimedia programs to a list of multimedia programs available for delivery to the user device.

5. The method of claim 1, further comprising:
sending to a distribution network control information for use in setting up one or more bearer paths with the user device.

6. The method of claim 1, wherein the first portion of the program guide is sent upon registration of the user device with a distribution network.

7. The method of claim 1, wherein the first portion of the program guide is sent in response to a program guide request by the user device.

8. The method of claim 1, wherein the user device is associated with a service profile that identifies one or more multimedia services the user device has access to.

9. The method of claim 1, wherein the identified transport mode is multicast, and further comprising:
determining whether the requested program is currently being delivered over a multicast channel to which the user device has access, and if so, sending information to the user device to enable the user device to extract the requested program from that multicast channel.

10. The method of claim 1, wherein the identified transport mode is multicast, and further comprising:
determining whether the requested program is currently being delivered over a multicast channel to which the user device has access to, and if not, sending a notification to another network entity to start delivering the requested program over a multicast channel to which the user device has access.

11. The method of claim 1, further comprising:
retrieving a service profile associated with the user device; and
taking an action based on the retrieved service profile.

12. The method of claim 11, wherein taking the action comprises one or more of the following:
determining whether the user device is capable of accessing the requested program; and
identifying a quality of service the user device is subscribed to receive.

13. The method of claim 1, further comprising:
maintaining a count of a number of user devices to which a program is being delivered over unicast channels; and
dynamically establishing a multicast channel when the count exceeds a threshold value.

14. The method of claim 13, further comprising:
sending a notification to another network entity to start delivering the program over the newly-established multicast channel; and
sending information to the user devices to enable the user devices to extract the program from the newly-established multicast channel.

15. The method of claim 1, wherein the one or more bearer paths are set up over a plurality of distribution networks, the distribution networks using different access technologies.

16. The method of claim 15, wherein the one or more bearer paths comprise unicast channels and the distribution networks comprise a Global System for Mobile Communications (GSM) network, a General Packet Radio Service (GPRS) network, a Universal Mobile Telecommunications System (UMTS), an Evolution-Data Optimized (EV-DO) network, a High-Speed Downlink Packet Access network, and a High-Speed Uplink Packet Access network.

17. The method of claim 15, wherein the one or more bearer paths comprise multicast channels and the distribution networks comprise:
a cellular multicast network that comprises a Code Division Multiple Access (CDMA) network implementing a Broadcast-Multicast Service (BCMCS) service, and a Global System for Mobile Communications (GSM) network implementing a Multimedia Broadcast/Multicast Service (MBMS) service;
a broadband wireless network that comprises a Worldwide Interoperability for Microwave Access (WiMAX) network, and a Wireless Broadband (WiBro) network;
a wireless multicast network that comprises a MediaFLO network, a Digital Video Broadcasting Handheld (DVB-H) network, and a Digital Multimedia Broadcasting network (DMB); and
a wired network that comprises a Digital Subscriber Line (DSL) network, a Gigabit Ethernet network, a Frame Relay network, and a cable network.

18. The method of claim 1, wherein the one or more bearer paths used to deliver a multicast service to the user device originate at a second user device.

19. The method of claim 1, wherein the network entity is configured to interoperate in one of a 3GPP Internet Protocol Multimedia Subsystem (IMS) network architecture and a 3GPP2 Multimedia Domain (MMD) network architecture.

20. The method of claim 19, further comprising:
provisioning a multimedia service so that one or more multimedia programs are available for delivery to the user device.

21. The method of claim 20, wherein the provisioning comprises:
for each of the one or more multimedia programs, receiving program-related parameters, network-related parameters, and user-related parameters from a network operator.

22. The method of claim 20, wherein the provisioning comprises:
adding the one or more multimedia programs to a list of multimedia programs available for delivery to the user device.

23. The method of claim 19, further comprising:
sending to a distribution network control information for use in setting up the one or more bearer paths with the user device.

24. The method of claim 19, wherein the first portion of the program guide is sent upon registration of the user device with a distribution network.

25. The method of claim 19, wherein the first portion of the program guide is sent in response to a program guide request by the user device.

26. The method of claim 19, wherein the user device is associated with a service profile that identifies one or more multimedia services the user device has access to.

27. The method of claim 19, wherein the identified transport mode is multicast, and further comprising:
determining whether the requested program is currently being delivered over a multicast channel to which the user device has access, and if so, sending information to the user device to enable the user device to extract the requested program from that multicast channel.

28. The method of claim 19, wherein the identified transport mode is multicast, and further comprising:
determining whether the requested program is currently being delivered over a multicast channel to which the user device has access to, and if not, sending a notification to another network entity to start delivering the requested program over a multicast channel to which the user device has access.

29. The method of claim 19, further comprising:
retrieving a service profile associated with the user device; and
taking an action based on the retrieved service profile.

30. The method of claim 29, wherein taking the action comprises one or more of the following:
determining whether the user device is capable of accessing the requested program; and
identifying a quality of service the user device is subscribed to receive.

31. The method of claim 19, further comprising:
maintaining a count of a number of user devices to which a program is being delivered over unicast channels; and
dynamically establishing a multicast channel when the count exceeds a threshold value.

32. The method of claim 31, further comprising:
sending a notification to another network entity to start delivering the program over the newly-established multicast channel; and
sending information to the user devices to enable the user devices to extract the program from the newly-established multicast channel.

33. The method of claim 19, wherein the one or more bearer paths are set up over a plurality of distribution networks, the distribution networks using different access technologies.

34. The method of claim 33, wherein the one or more bearer paths comprise unicast channels and the distribution networks comprise a Global System for Mobile Communications (GSM) network, a General Packet Radio Service (GPRS) network, a Universal Mobile Telecommunications System (UMTS), an Evolution-Data Optimized (EV-DO) network, a High-Speed Downlink Packet Access network, and a High-Speed Uplink Packet Access network.

35. The method of claim 33, wherein the one or more bearer paths comprise multicast channels and the distribution networks comprise:
a cellular multicast network that comprises a Code Division Multiple Access (CDMA) network implementing a Broadcast-Multicast Service (BCMCS) service, and a Global System for Mobile Communications (GSM) network implementing a Multimedia Broadcast/Multicast Service (MBMS) service;
a broadband wireless network that comprises a Worldwide Interoperability for Microwave Access (WiMAX) network, and a Wireless Broadband (WiBro) network;
a wireless multicast network that comprises a MediaFLO network, a Digital Video Broadcasting Handheld (DVB-H) network, and a Digital Multimedia Broadcasting network (DMB); and
a wired network that comprises a Digital Subscriber Line (DSL) network, a Gigabit Ethernet network, a Frame Relay network, and a cable network.

36. The method of claim 19, wherein the one or more bearer paths used to deliver a multicast service to the user device originate at a second user device.

37. The method of claim 19, wherein the network entity provides functionality of a modified 3GPP2 Broadcast and Multicast Service (BCMCS) controller component configured to enable BCMCS signaling protocol transactions to occur over interfaces of one of a 3GPP IMS network architecture and a 3GPP2 MMD network architecture.

38. The method of claim 37, further comprising:
performing 3GPP2 BCMCS service discovery and announcement functionality by generating the program guide and delivering the program guide to the user device.

39. The method of claim 37, further comprising:
performing 3GPP2 BCMCS content subscription and information functionality by authenticating and authorizing the handsets and delivering encryption keys and control information in a way compatible to 3GPP2 BCMCS transactions performed over interfaces of one of the 3GPP IMS network architecture and the 3GPP2 MMD network architecture.

40. The method of claim 37, further comprising:
performing 3GPP2 BCMCS content delivery functionality by having a MRFC functional entity of one of the 3GPP IMS network architecture and the 3GPP2 MMD network architecture send control information to a MRFP functional entity of one of the 3GPP IMS network architecture and the 3GPP2 MMD network architecture so as to enable content to be sent content to the user device through a distribution network.

41. The method of claim 37, further comprising:
performing 3GPP2 BCMCS controller discovery functionality by having a S-CSCF functional entity of one of the 3GPP IMS network architecture and the 3GPP2 MMD network architecture send user requests to a network entity.

42. The method of claim 37, further comprising:
performing 3GPP2 BCMCS accounting functionality by having an HSS functional entity of one of the 3GPP IMS network architecture and the 3GPP2 MMD network architecture collect accounting records in a manner compatible with BCMCS transactions performed over the interfaces of one of the 3GPP IMS network architecture and the 3GPP2 MMD network architecture.

43. The method of claim 37, further comprising:
performing 3GPP2 BCMCS subscription profile manager functionality by having a network operator configure user subscription information in a HSS functional entity of one of the 3GPP IMS network architecture and the 3GPP2 MMD network architecture.

44. The method of claim 37, wherein:
an interface between a 3GPP2 BCMCS controller and the user device is implemented with a SIP Interface between the network entity and the user device;
an interface between a 3GPP2 BCMCS controller and a broadcast serving node is implemented with a Mb Interface;
an interface between a 3GPP2 BCMCS controller and a content server is implemented with a Mp Interface;
an interface between a 3GPP2 BCMCS controller and an authenticate, authorize, and accounting (AAA) server is implemented with a Sh Interface; and
an interface between a 3GPP2 BCMCS controller and a subscription profile manager is implemented with a Sh interface;
wherein each of the SIP Interface, Mb Interface, Mp Interface, Sh Interface is an interface of one of the 3GPP IMS network architecture and the 3GPP2 MMD network architecture.

45. The method of claim 1, wherein the first portion of the program guide includes time insensitive elements and the second portion of the program guide includes time sensitive elements.

46. The method of claim 1, wherein the transport mode associated with the multimedia program is identified in accordance with the service-specific parameters and the program-specific parameters.

47. The method of claim 46, wherein one or more of the program-specific parameters overrides a corresponding one or more of the service-specific parameters.

48. The method of claim 1, wherein the second portion of the program guide is sent, from the network entity to the user device, on a periodic basis.

49. The method of claim 1, wherein the service-specific parameters comprise one or more of the following: transport mode parameters, geographical area parameters, encryption mode parameters, quality of service parameters, network configuration parameters, security and access parameters, announcement parameters, and charging model parameters.

50. The method of claim 1, wherein the program-specific parameters comprise one or more of the following: a program name, a program identifier, a program availability time, a program start time, a program end time, encryption mode parameters, quality of service parameters, application bit rate parameters, and user information that specifies a service profile associated with the program.

51. A computer storage device comprising machine-executable instructions to cause a network entity to:
generate a program guide that provides a list of multimedia programs available for delivery to a user device, the program guide including a first portion comprising service-specific parameters common to all programs in the list and a second portion comprising program-specific parameters associated with at least one program in the list;
send to the user device the second portion of the program guide without sending the first portion of the program guide;
receive, from the user device, a request for delivery of a multimedia program;
identify a transport mode associated with the multimedia program, the transport mode indicating whether the user device will receive the multimedia program over a unicast channel or a multicast channel of one or more bearer paths; and
transmit a communication that causes the user device to receive the multimedia program over a unicast channel or a multicast channel of the one or more bearer paths based at least in part on the identified transport mode.

52. The computer storage device of claim 51, further comprising:
instructions to provision a multimedia service so that one or more multimedia programs are available for delivery to the user device; and
instructions to send to a distribution network control information for use in setting up the one or more bearer paths with the user device.

53. The computer storage device of claim 51, further comprising instructions to:
maintain a count of a number of user devices to which a program is being delivered over unicast channels; and
dynamically establish a multicast channel when the count exceeds a threshold value.

54. The computer storage device of claim 51, wherein the one or more bearer paths are set up over a plurality of distribution networks, the distribution networks using different access technologies.

55. The computer storage device of claim 51, wherein the one or more bearer paths used to deliver a multicast service to the user device originate at a second user device.

56. The computer storage device of claim 51, wherein the network entity is configured to interoperate in one of a 3GPP Internet Protocol Multimedia Subsystem (IMS) network architecture and a 3GPP2 Multimedia Domain (MMD) network architecture.

57. The computer storage device of claim 51, wherein the network entity is configured to provide functionality of a modified 3GPP2 Broadcast and Multicast Service (BCMCS) controller component so as to enable BCMCS signaling protocol transactions to occur over interfaces of one of a 3GPP Internet Protocol Multimedia Subsystem (IMS) network architecture and a 3GPP2 Multimedia Domain (MMD) network architecture.

58. The computer storage device of claim 57, further comprising one of more of:
instructions to perform 3GPP2 BCMCS service discovery and announcement functionality by generating the program guide and sending the program guide to the user device;
instructions to perform 3GPP2 BCMCS content subscription and information functionality by authenticating and authorizing the user device and delivering encryption keys and control information in a way compatible to 3GPP2 BCMCS transactions performed over interfaces of one of the 3GPP IMS network architecture and the 3GPP2 MMD network architecture;
instructions to perform 3GPP2 BCMCS content delivery functionality by having a MRFC functional entity of one of the 3GPP IMS network architecture and the 3GPP2 MMD network architecture send control information to a MRFP functional entity of one of the 3GPP IMS network architecture and the 3GPP2 MMD network architecture so as to enable content to be sent content to the user device through a distribution network;
instructions to perform 3GPP2 BCMCS controller discovery functionality by having a S-CSCF functional entity interfaces of one of the 3GPP IMS network architecture and the 3GPP2 MMD network architecture send user requests to a network entity;
instructions to perform 3GPP2 BCMCS accounting functionality by having a HSS functional entity of one of the 3GPP IMS network architecture and the 3GPP2 MMD network architecture collect accounting records in a manner compatible with BCMCS transactions performed over the interfaces of one of the 3GPP IMS network architecture and the 3GPP2 MMD network architecture; and
instructions to perform 3GPP2 BCMCS subscription profile manager functionality by having a network operator configure user subscription information in a HSS functional entity of one of the 3GPP IMS network architecture and the 3GPP2 MMD network architecture.

59. A network entity comprising:
means for generating a program guide that provides a list of multimedia programs available for delivery to a user device, the program guide including a first portion comprising service-specific parameters common to all programs in the list and a second portion comprising program-specific parameters associated with at least one program in the list;
means for sending to the user device the second portion of the program guide without sending the first portion of the program guide;
means for receiving, from the user device, a request for delivery of a multimedia program;

means for identifying a transport mode associated with the multimedia program, the transport mode indicating whether the user device will receive the multimedia program over a unicast channel or a multicast channel of one or more bearer paths; and means for transmitting a communication that causes the user device to receive the multimedia program over a unicast channel or a multicast channel of the one or more bearer paths based at least in part on the identified transport mode.

60. The network entity of claim 59, further comprising:
means for provisioning a multimedia service so that one or more multimedia programs are available for delivery to the user device; and
means for sending to a distribution network control information for use in setting up the one or more bearer paths with the user device.

61. The network entity of claim 59, further comprising:
means for maintaining a count of a number of user devices to which a program is being delivered over unicast channels; and
means for dynamically establishing a multicast channel when the count exceeds a threshold value.

62. The network entity of claim 59, wherein the one or more bearer paths are set up over a plurality of distribution networks, the distribution networks using different access technologies.

63. The network entity of claim 59, wherein the one or more bearer paths used to deliver a multicast service to the user device originate at a second user device.

64. The network entity of claim 59, wherein the network entity is configured to interoperate in one of a 3GPP Internet Protocol Multimedia Subsystem (IMS) network architecture and a 3GPP2 Multimedia Domain (MMD) network architecture.

65. The network entity of claim 59, wherein the network entity is configured to provide functionality of a modified Broadcast and Multicast Service (BCMCS) controller component so as to enable 3GPP2 BCMCS signaling protocol transactions to occur over interfaces of one of a 3GPP Internet Protocol Multimedia Subsystem (IMS) network architecture and a 3GPP2 Multimedia Domain (MMD) network architecture.

66. The network entity of claim 65, further comprising:
means for performing 3GPP2 BCMCS service discovery and announcement functionality by generating the program guide and sending the program guide to the user device;
means for performing 3GPP2 BCMCS content subscription and information functionality by authenticating and authorizing the user device and delivering encryption keys and control information in a way compatible to BCMCS transactions performed over the IMS interfaces or the MMD interfaces;
means for performing 3GPP2 BCMCS content delivery functionality by having a MRFC functional entity of one of the 3GPP IMS network architecture and the 3GPP2 MMD network architecture send control information to a MRFP functional entity of one of the 3GPP IMS network architecture and the 3GPP2 MMD network architecture so as to enable content to be sent content to the user device through a distribution network;
means for performing 3GPP2 BCMCS controller discovery functionality by having a S-CSCF functional entity of one of the 3GPP IMS network architecture and the 3GPP2 MMD network architecture send user requests to a network entity;
means for performing 3GPP2 BCMCS accounting functionality by having a HSS functional entity of one of the 3GPP IMS network architecture and the 3GPP2 MMD network architecture collect accounting records in a manner compatible with BCMCS transactions performed over the interfaces of one of the 3GPP IMS network architecture and the 3GPP2 MMD network architecture; and
means for performing 3GPP2 BCMCS subscription profile manager functionality by having a network operator configure user subscription information in a HSS functional entity of one of the 3GPP IMS network architecture and the 3GPP2 MMD network architecture.

67. The network entity of claim 65, further comprising:
means for implementing an interface between a 3GPP2 BCMCS controller and a handset with a SIP Interface between the network entity and the user device;
means for implementing an interface between a 3GPP2 BCMCS controller and a broadcast serving node with a Mb Interface;
means for implementing an interface between a 3GPP2 BCMCS controller and a content server with a Mp Interface;
means for implementing an interface between a 3GPP2 BCMCS controller and an authenticate, authorize, and accounting (AAA) server with a Sh Interface; and
means for implementing an interface between a 3GPP2 BCMCS controller and a subscription profile manager with a Sh interface,
wherein each of the SIP Interface, Mb Interface, Mp Interface, Sh Interface is an interface of one of the 3GPP IMS network architecture and the 3GPP2 MMD network architecture.

68. A method comprising:
providing a common interface through which a network operator defines service-specific parameters of a plurality of unicast and multicast multimedia services deployed in a distribution network;
defining, by the network operator through the common interface, program-specific parameters of a multimedia program that is associated with at least one of the multimedia services, the program-specific parameters comprising a transport mode that indicates whether a user device will receive the multimedia program over a unicast channel or a multicast channel of one or more bearer paths;
generating a program guide that provides a list of multimedia programs including the multimedia program available for delivery to the user device, the program guide including a first portion comprising the service-specific parameters and a second portion comprising the program-specific parameters;
sending to the user device the second portion of the program guide without sending the first portion of the program guide.

69. The method of claim 68, wherein the service-specific parameters are common to all programs associated with the multimedia service.

70. The method of claim 68, wherein the service-specific parameters comprise one or more of the following: transport mode parameters, geographical area parameters, encryption mode parameters, quality of service parameters, network configuration parameters, security and access parameters, announcement parameters, and charging model parameters.

71. The method of claim 68, wherein the program-specific parameters comprise one or more of the following: a program name, a program identifier, a program availability time, a program start time, a program end time, encryption mode parameters, quality of service parameters, application bit rate parameters, and user information that specifies a service profile associated with the program.

72. The method of claim 68, wherein one or more of the program-specific parameters overrides corresponding one or more of the service-specific parameters.

73. The method of claim 68, wherein through the common interface, the network operator defines rendering parameters of a program guide to be displayed on the user device in communication with the distribution network, parameters associated with program guide delivery, and parameters associated with program guide geography.

74. The method of claim 68, wherein the common interface resides on a network entity that is configured to interoperate in a 3GPP Internet Protocol Multimedia Subsystem (IMS) network architecture or a 3GPP2 Multimedia Domain (MMD) network architecture.

75. A computer storage device comprising machine-executable instructions to cause the machine to:
provide a common interface through which a network operator defines service-specific parameters of a plurality of unicast and multicast multimedia services deployed in a distribution network;
define, by the network operator through the common interface, program-specific parameters of a multimedia program that is associated with at least one or the multimedia services, the program-specific parameters comprising a transport mode that indicates whether a user device will receive the multimedia program over a unicast channel or a multicast channel of one or more bearer paths;
generate a program guide that provides a list of multimedia programs including the multimedia program available for delivery to the user device, the program guide including a first portion comprising the service-specific parameters and a second portion comprising the program-specific parameters;
send to the user device the second portion of the program guide without sending the first portion of the program guide.

76. The computer storage device of claim 75, wherein through the common interface, the network operator defines one or more of the following:
rendering parameters of a program guide to be displayed on the user device in communication with the distribution network, parameters associated with program guide delivery, and parameters associated with program guide geography.

77. The computer storage device of claim 75, wherein the common interface resides on a network entity that is configured to interoperate in one of a 3GPP Internet Protocol Multimedia Subsystem (IMS) network architecture and a 3GPP2 Multimedia Domain (MMD) network architecture.

78. An apparatus comprising:
means for providing a common interface through which a network operator defines service-specific parameters of a plurality of unicast and multicast multimedia services deployed in a distribution network;
means for defining, by the network operator through the common interface, program-specific parameters of a that is associated with at least one or the multimedia services, the program-specific parameters comprising a transport mode that indicates whether a user device will receive the multimedia program over a unicast channel or a multicast channel of one or more bearer paths;
means for generating a program guide that provides a list of multimedia programs including the multimedia program available for delivery to the user device, the program guide including a first portion comprising the service-specific parameters and a second portion comprising the program-specific parameters;
means for sending to the user device the second portion of the program guide without sending the first portion of the program guide.

79. The apparatus of claim 78, wherein through the common interface, the network operator defines one or more of the following:
rendering parameters of a program guide to be displayed on the user device in communication with the distribution network, parameters associated with program guide delivery, and parameters associated with program guide geography.

80. The apparatus of claim 78, wherein the common interface resides on a network entity that is configured to interoperate in one of a 3GPP Internet Protocol Multimedia Subsystem (IMS) network architecture and a 3GPP2 Multimedia Domain (MMD) network architecture.

\* \* \* \* \*

UNITED STATES PATENT AND TRADEMARK OFFICE
CERTIFICATE OF CORRECTION

PATENT NO. : 11,477,617 B2
APPLICATION NO. : 11/385009
DATED : October 18, 2022
INVENTOR(S) : Chiussi et al.

It is certified that error appears in the above-identified patent and that said Letters Patent is hereby corrected as shown below:

In the Drawings

Figure 1:
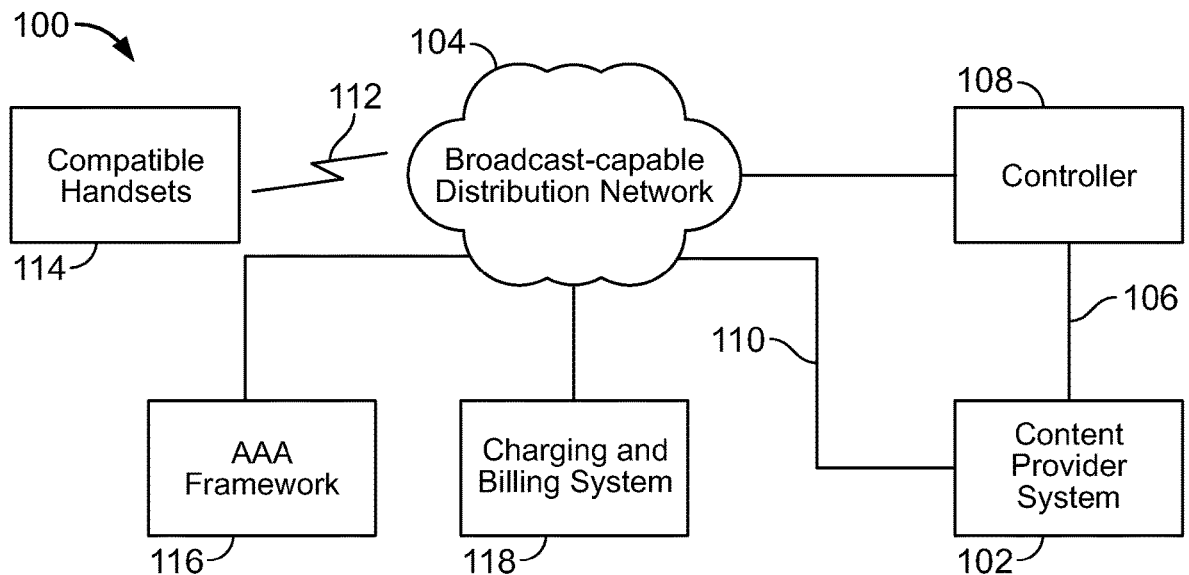
FIG. 1 is a block diagram of a broadcast-capable network.
Figure 2:
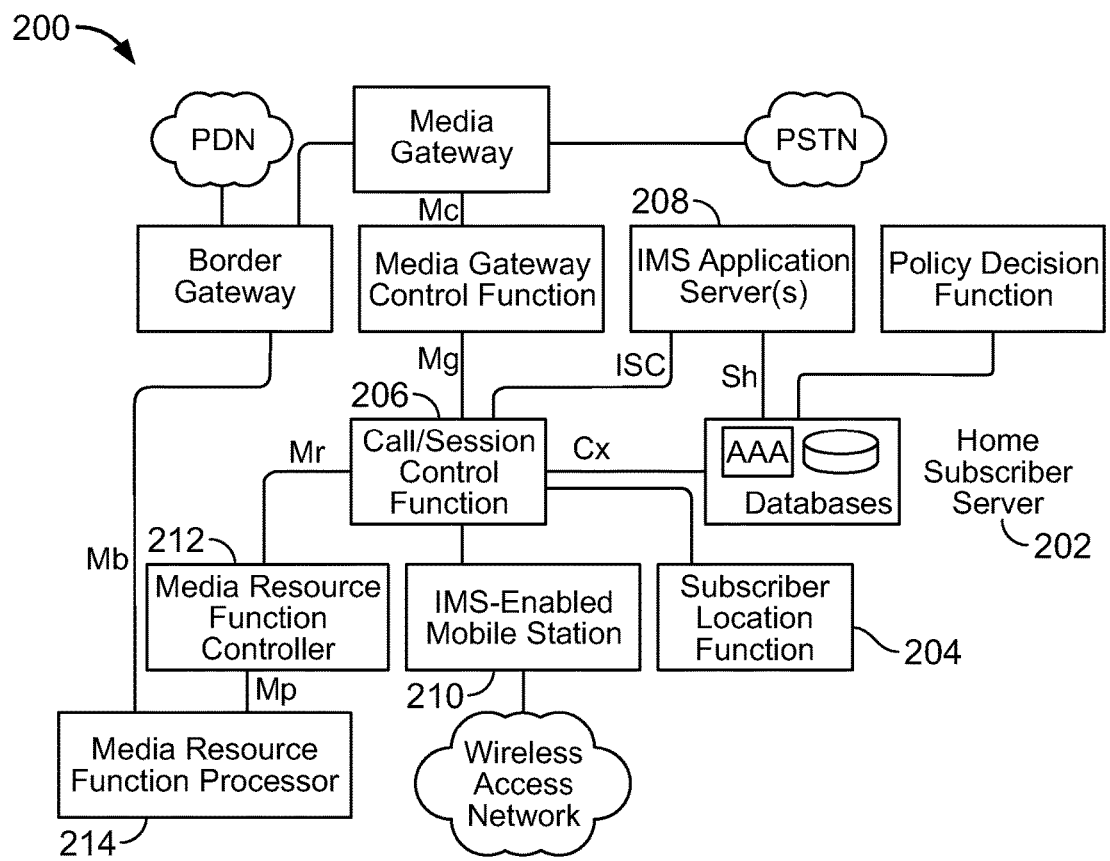
FIG. 2 is a block diagram of a 3GPP IMS Network.

In Fig. 2, Sheet 1 of 10, for Tag "206", in Line 1, delete "CALL/SESSION" and insert -- CALL SESSION --, therefor.

In the Specification

In Column 1, Line 23, delete "Over time" and insert -- Over time, --, therefor.

In Column 2, Line 9, delete "Microwvave" and insert -- Microwave --, therefor.

In Column 2, Lines 11-12, delete "Multicast Broadcast Service (MCBCS)" and insert -- Multicast and Broadcast Service (MCBCS) --, therefor.

In Column 3, Line 14, delete "User" and insert -- user --, therefor.

In Column 3, Line 43, delete "Servers." and insert -- Servers, --, therefor.

In Column 3, Lines 43-44, delete "Home-Subscriber" and insert -- Home Subscriber --, therefor.

In Column 3, Line 48, delete "RFC 3558." and insert -- RFC 3588. --, therefor.

In Column 3, Line 48, delete "but" and insert -- by --, therefor.

In Column 4, Lines 29-30, delete "IMS network 100," and insert -- IMS network 200, --, therefor.

In Column 4, Line 33, delete "HSS 120" and insert -- HSS 202 --, therefor.

In Column 4, Line 55, delete "formal" and insert -- format --, therefor.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 11,477,617 B2

In Column 4, Line 59, delete "implement-IMS" and insert -- implement IMS --, therefor.

In Column 5, Line 12, delete "multimedia program" and insert -- multimedia programs --, therefor.

In Column 5, Line 30, delete "devices," and insert -- devices; --, therefor.

In Column 6, Lines 19-20, delete "Digital Multimedia Broadcasting network (DMB);" and insert -- Digital Multimedia Broadcasting (DMB) network; --, therefor.

In Column 6, Line 51, delete "enable content to be sent content to" and insert -- enable content to be sent to --, therefor.

In Column 6, Line 53, delete "may, include" and insert -- may include --, therefor.

In Column 6, Line 58, delete "enabling," and insert -- enabling --, therefor.

In Column 7, Line 44, delete "multimedia-services" and insert -- multimedia services --, therefor.

In Column 9, Line 13, delete "DESCRIPTION" and insert -- BRIEF DESCRIPTION --, therefor.

In Column 9, Lines 46-47, delete "Digital Multimedia Broadcasting network (DMB)," and insert -- Digital Multimedia Broadcasting (DMB) network, --, therefor.

In Column 10, Line 4, delete "IMS network 3800." and insert -- IMS network 300. --, therefor.

In Column 10, Line 33, delete "multimedia-controller" and insert -- multimedia controller --, therefor.

In Column 10, Line 44, delete "MRFP 314" and insert -- MRFC 314 --, therefor.

In Column 10, Lines 55-56, delete "initially" and insert -- initially, --, therefor.

In Column 10, Line 67, delete "network, to" and insert -- network to --, therefor.

In Column 11, Line 5, delete "can sent" and insert -- can send --, therefor.

In Column 11, Line 20, delete "Flow ID" and insert -- FlowID --, therefor.

In Column 11, Line 40, delete "312-conveys" and insert -- 312 conveys --, therefor.

In Column 11, Line 65, delete "offer" and insert -- over --, therefor.

In Column 12, Line 23, delete "CSCFs 320." and insert -- S-CSCFs 320. --, therefor.

In Column 13, Line 38, delete "Television" and insert -- television --, therefor.

CERTIFICATE OF CORRECTION (continued)
U.S. Pat. No. 11,477,617 B2

In Column 13, Line 50, delete "consent" and insert -- content --, therefor.

In Column 14, Line 19, delete "parameters" and insert -- parameters. --, therefor.

In Column 14, Line 26, delete "billed" and insert -- billed. --, therefor.

In Column 14, Line 42, delete "etc)" and insert -- etc.) --, therefor.

In Column 14, Line 53, delete "and" and insert -- grid --, therefor.

In Column 14, Lines 60-61, delete "highlighted)" and insert -- highlighted). --, therefor.

In Column 15, Line 5, delete "maybe" and insert -- may be --, therefor.

In Column 15, Line 22, delete "program specific" and insert -- program-specific --, therefor.

In Column 15, Line 34, delete "Network.""" and insert -- Network," --, therefor.

In Column 16, Line 35, delete "804)" and insert -- 304) --, therefor.

In Column 17, Line 8, delete "Mgr" and insert -- Mgr. --, therefor.

In Column 17, Line 62, delete "ray-tube)" and insert -- ray tube) --, therefor.

In Column 18, Line 3, delete "feedback." and insert -- feedback, --, therefor.

In Column 18, Line 4, delete "feedback," and insert -- feedback; --, therefor.

In Column 18, Line 8, delete "that a includes" and insert -- that includes --, therefor.

In Column 18, Line 13, delete "Web" and insert -- web --, therefor.

In Column 18, Line 20, delete "internet," and insert -- Internet, --, therefor.

In the Claims

In Column 19, Line 11, in Claim 6, delete "registration of the user" and insert -- registration of the at least one of the user --, therefor.

In Column 20, Line 15, in Claim 17, delete "Broadcasting Handheld" and insert -- Broadcasting—Handheld --, therefor.

In Column 20, Lines 16-17, in Claim 17, delete "Digital Multimedia Broadcasting network (DMB);" and insert -- Digital Multimedia Broadcasting (DMB) network; --, therefor.

In Column 21, Line 53, in Claim 35, delete "Broadcasting Handheld" and insert

CERTIFICATE OF CORRECTION (continued)
U.S. Pat. No. 11,477,617 B2

-- Broadcasting—Handheld --, therefor.

In Column 21, Lines 54-55, in Claim 35, delete "Multimedia Broadcasting network (DMB);" and insert -- Multimedia Broadcasting (DMB) network; --, therefor.

In Column 22, Lines 22-23, in Claim 40, delete "enable content to be sent content to" and insert -- enable content to be sent to --, therefor.

In Column 24, Lines 34-35, in Claim 58, delete "enable content to be sent content to" and insert -- enable content to be sent to --, therefor.

In Column 25, Lines 63-64, in Claim 66, delete "enable content to be sent content to" and insert -- enable content to be sent to --, therefor.

In Column 27, Line 29, in Claim 75, delete "one or the" and insert -- one of the --, therefor.

In Column 28, Line 19, in Claim 78, delete "one or the" and insert -- one of the --, therefor.